(12) United States Patent
Kato

(10) Patent No.: US 12,248,070 B2
(45) Date of Patent: Mar. 11, 2025

(54) INFORMATION PROCESSING DEVICE, CONTROL METHOD, PROGRAM AND STORAGE MEDIUM

(71) Applicant: PIONEER CORPORATION, Tokyo (JP)

(72) Inventor: Masahiro Kato, Kawagoe (JP)

(73) Assignee: PIONEER CORPORATION, Tokyo (JP)

(*) Notice: Subject to any disclaimer, the term of this patent is extended or adjusted under 35 U.S.C. 154(b) by 290 days.

(21) Appl. No.: 17/781,248

(22) PCT Filed: Dec. 3, 2020

(86) PCT No.: PCT/JP2020/045044
§ 371 (c)(1),
(2) Date: May 31, 2022

(87) PCT Pub. No.: WO2021/112177
PCT Pub. Date: Jun. 10, 2021

(65) Prior Publication Data
US 2022/0413150 A1 Dec. 29, 2022

(30) Foreign Application Priority Data
Dec. 4, 2019 (JP) .................................. 2019-219675

(51) Int. Cl.
*G01S 17/89* (2020.01)
(52) U.S. Cl.
CPC .................... *G01S 17/89* (2013.01)
(58) Field of Classification Search
CPC ........................................................ G01S 17/89
See application file for complete search history.

(56) References Cited

U.S. PATENT DOCUMENTS

2011/0066303 A1* 3/2011 Hara ...................... G01C 21/28
701/1
2014/0011518 A1* 1/2014 Valaee ................ G01S 5/02526
455/456.1

(Continued)

FOREIGN PATENT DOCUMENTS

CN 106908775 B 10/2019
EP 3940422 A1 1/2022
(Continued)

OTHER PUBLICATIONS

Patent Cooperation Treaty, International Search Report for PCT/JP2020/045044, dated Jan. 21, 2021, in 4 pages.

(Continued)

*Primary Examiner* — Hunter B Lonsberry
*Assistant Examiner* — Harrison Heflin
(74) *Attorney, Agent, or Firm* — PROCOPIO, CORY, HARGREAVES & SAVITCH LLP

(57) ABSTRACT

An information processing device includes an acquisition unit configured to acquire point cloud data outputted by a measurement device, an association unit configured to associate, through matching between the point cloud data and position information of an object for each of voxels into which a space is divided, measurement points constituting the point cloud data with the voxels, a position estimation unit configured to perform a position estimation of a moving body equipped with the measurement device, based on the measurement points associated with any of the voxels and the position information for the associated voxels, and a calculation unit configured to calculate a reliability index of a position acquired by the position estimation based on a ratio of a number of the measurement points associated with any of the voxels to a number of the measurement points constituting the point cloud data.

6 Claims, 13 Drawing Sheets

(56) References Cited

U.S. PATENT DOCUMENTS

| | | |
|---|---|---|
| 2014/0309841 A1 | 10/2014 | Hara et al. |
| 2018/0079085 A1 | 10/2018 | Nakata et al. |
| 2018/0364717 A1 | 12/2018 | Douillard et al. |
| 2020/0103234 A1 | 4/2020 | Fujiya et al. |
| 2020/0271454 A1 | 8/2020 | Kato |
| 2020/0353923 A1* | 11/2020 | Perrin ................. G05D 1/0246 |
| 2021/0010814 A1* | 1/2021 | Demir .................... G01C 21/28 |
| 2021/0373161 A1* | 12/2021 | Lu .......................... G06N 3/088 |
| 2022/0137638 A1* | 5/2022 | Tomono ............. G01C 21/3848 |
| | | 701/25 |

FOREIGN PATENT DOCUMENTS

| | | |
|---|---|---|
| JP | 2017-45447 A | 3/2017 |
| WO | 2013/076829 A1 | 4/2015 |
| WO | 2018/180096 A1 | 10/2018 |
| WO | 2018/221453 A1 | 12/2018 |
| WO | 2018212287 A1 | 3/2020 |
| WO | 2020/183659 A1 | 9/2020 |

OTHER PUBLICATIONS

European Patent Office, Extended European Search Report, Application No. 20897106.9-1206, dated Nov. 7, 2023, in 8 pages.
Nakagomi, et al., "3D Scan matching for mobile robot localization over rough terrain", Wiley Periodicals, Inc., Electr. Eng. Jpn. Nov. 7, 2019; 209: 14-25.

* cited by examiner

INFORMATION PROCESSING DEVICE, CONTROL METHOD, PROGRAM AND STORAGE MEDIUM

CROSS-REFERENCE TO RELATED APPLICATIONS

This application is US National Stage of International Patent Application PCT/JP2020/045044, filed Dec. 3, 2020, which claims benefit of priority from Japanese Patent Application JP2019-219675, filed Dec. 4, 2019, the contents of both of which are incorporated herein by reference.

TECHNICAL FIELD

The present invention relates to a calculation of a reliability index to be used in position estimation.

BACKGROUND ART

Conventionally, there is known a technique for estimating the self-position of a vehicle by collating (matching) the shape data of a peripheral object measured by a measuring device such as a laser scanner with the map information in which the shape of the peripheral object is stored in advance. For example, Patent Literature 1 discloses an autonomous mobile system configured to determine whether a detected object situated in each voxel that is obtained by dividing the space by a predetermined rule is a stationary object or a moving body and to perform matching between map information and measurement data for voxels in which stationary objects are present. Further, Patent Literature 2 discloses a scan matching method for performing the own vehicle position estimation by matching (verification) between point cloud data outputted by lidar and voxel data which includes the mean vector and the covariance matrix of stationary object(s) for each voxel.

PRIOR ART DOCUMENTS

Patent Literature

Patent Literature 1: WO2013/076829
Patent Literature 2: WO2018/221453

SUMMARY

Problem to be Solved by the Invention

In the own vehicle position estimation by matching between the voxel data and the point cloud data outputted by lidar, a process of searching for the estimation parameter at which the score value indicating the degree of the matching becomes the maximum is performed. Since this search process is performed by limiting the search range so that it can be completed within a predetermined processing time, it could be a local solution even if the score value is maximum. Further, even when the occlusion of a target feature of measurement by other vehicles occurs, there is a case that the above-described score value does not deteriorate much. In such a case, there is a possibility that accurate estimation parameters cannot be calculated. Thus, there is a case that the above score value is insufficient as an index representing the reliability of the estimated position.

The present invention has been made in order to solve the above issues, and it is an object of the present invention to provide an information processing device capable of calculating an index suitably representing the reliability of an estimated position.

Means for Solving the Problem

One invention is an information processing device including: an acquisition unit configured to acquire point cloud data outputted by a measurement device; an association unit configured to associate, through matching between the point cloud data and position information of an object for each of unit areas into which a space is divided, measurement points constituting the point cloud data with the unit areas; a position estimation unit configured to perform a position estimation of a moving body equipped with the measurement device, based on the measurement points associated with any of the unit areas and the position information for the associated unit areas; and a calculation unit configured to calculate a reliability index of a position acquired by the position estimation based on a ratio of a number of the measurement points associated with any of the unit areas to a number of the measurement points constituting the point cloud data.

Another invention is a control method executed by an information processing device, the control method including: acquiring point cloud data outputted by a measurement device; associating, through matching between the point cloud data and position information of an object for each of unit areas into which a space is divided, measurement points constituting the point cloud data with the unit areas; performing a position estimation of a moving body equipped with the measurement device, based on the measurement points associated with any of the unit areas and the position information for the associated unit areas; and calculating a reliability index of a position acquired by the position estimation based on a ratio of a number of the measurement points associated with any of the unit areas to a number of the measurement points constituting the point cloud data.

Still another invention is a program executed by a computer, the program causing the computer to function as: an acquisition unit configured to acquire point cloud data outputted by a measurement device; an association unit configured to associate, through matching between the point cloud data and position information of an object for each of unit areas into which a space is divided, measurement points constituting the point cloud data with the unit areas; a position estimation unit configured to perform a position estimation of a moving body equipped with the measurement device, based on the measurement points associated with any of the unit areas and the position information for the associated unit areas; and a calculation unit configured to calculate a reliability index of a position acquired by the position estimation based on a ratio of a number of the measurement points associated with any of the unit areas to a number of the measurement points constituting the point cloud data.

DETAILED DESCRIPTION OF PREFERRED EMBODIMENTS

Figure 1:
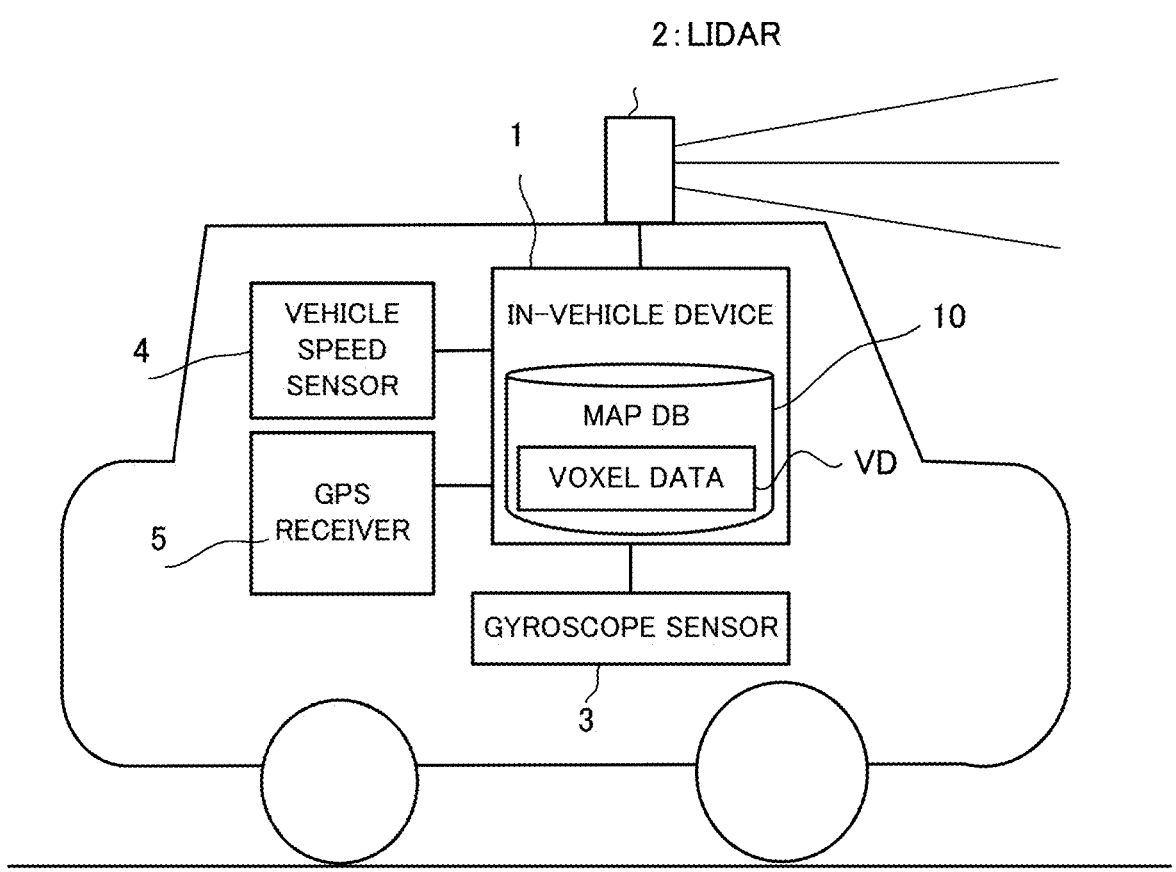
FIG. 1 is a schematic configuration diagram of a driving support system.

In one preferred embodiment of the present invention, an information processing device includes: an acquisition unit configured to acquire point cloud data outputted by a measurement device; an association unit configured to associate, through matching between the point cloud data and position information of an object for each of unit areas into which a space is divided, measurement points constituting the point cloud data with the unit areas; a position estimation unit configured to perform a position estimation of a moving body equipped with the measurement device, based on the measurement points associated with any of the unit areas and the position information for the associated unit areas; and a calculation unit configured to calculate a reliability index of a position acquired by the position estimation based on a ratio of a number of the measurement points associated with any of the unit areas to a number of the measurement points constituting the point cloud data.

When the position estimation is performed by associating the point cloud data outputted by the measuring device with the position information of the object for each unit area, it is inferred that the higher the ratio of the number of measurement points associated with the position information of the object to the overall number of measured measurement points is, the higher the reliability of the estimated position becomes. Therefore, in this mode, when performing the position estimation by associating the point cloud data with the position information of the object for each unit area, the information processing device can suitably calculate a reliability index that accurately represents the reliability of the estimated position.

In one mode of the information processing device, the position estimation unit determines whether or not to re-perform the position estimation based on the reliability index. According to this mode, the information processing device can accurately determine the necessity of re-execution of the position estimation.

In another mode of the information processing device, the position estimation unit performs the position estimation by searching for an estimation parameter relating to the position of the moving body within a predetermined search range, and the position estimation unit determines the search range to be used when re-performing the position estimation, based on a value of the estimation parameter acquired by the immediately preceding position estimation. According to this mode, the information processing device can re-perform the position estimation while suitably varying the search range thereby to suitably search for the optimal solution of the estimation parameter.

In still another mode of the information processing device, the position estimation unit repeatedly performs the position estimation until at least one condition is satisfied among: a condition that the reliability index is equal to or larger than a predetermined threshold value; a condition that there is no variation in the reliability index; and a condition that the number of times to have performed the position estimation reaches a predetermined upper limit number. According to this mode, the information processing device can repeatedly perform the position estimation by only required number of times.

In still another mode of the information processing device, the position estimation unit determines the upper limit number based on the movement speed of the moving body. According to this mode, the information processing device can suitably determine an upper limit of the number of times to perform the position estimation.

In still another mode of the information processing device, the position estimation unit performs the position estimation by searching for an estimation parameter relating to the position of the moving body within a predetermined search range, and the position estimation unit performs the position estimation, by a number of times determined based on the reliability index, using the search range determined based on a value of the estimation parameter acquired by the immediately preceding position estimation. According to this mode, the information processing device can perform the position estimation by only required number of times based on the reliability index.

In still another mode of the information processing device, the position estimation unit calculates the reliability index based on: a degree of the matching between the measurement points associated with any of the unit areas and the position information for the associated unit areas; and the ratio. According to this mode, the information processing device can suitably calculate the reliability index accurately reflecting the reliability of the estimated position.

According to another preferred embodiment of the present invention, control method executed by an information processing device, the control method includes: acquiring point cloud data outputted by a measurement device; associating, through matching between the point cloud data and position information of an object for each of unit areas into which a space is divided, measurement points constituting the point cloud data with the unit areas; performing a position estimation of a moving body equipped with the measurement device, based on the measurement points associated with any of the unit areas and the position information for the associated unit areas; and calculating a reliability index of a position acquired by the position estimation based on a ratio of a number of the measurement points associated with any of the unit areas to a number of the measurement points constituting the point cloud data. By executing the above-mentioned control method, when performing the position estimation by associating the point cloud data with the position information of the object for each unit area, the information processing device can suitably calculate a reliability index that accurately represents the reliability of the estimated position.

According to still another preferred embodiment of the present invention, there is provided a program executed by a computer, the program causing the computer to function as: an acquisition unit configured to acquire point cloud data outputted by a measurement device; an association unit configured to associate, through matching between the point cloud data and position information of an object for each of unit areas into which a space is divided, measurement points constituting the point cloud data with the unit areas; a position estimation unit configured to perform a position estimation of a moving body equipped with the measurement device, based on the measurement points associated with any of the unit areas and the position information for the associated unit areas; and a calculation unit configured to calculate a reliability index of a position acquired by the position estimation based on a ratio of a number of the measurement points associated with any of the unit areas to a number of the measurement points constituting the point cloud data. By executing this program, when performing the position estimation by associating the point cloud data with the position information of the object for each unit area, the computer can suitably calculate a reliability index that accurately represents the reliability of the estimated position. In some embodiments, the program is stored in a storage medium.

Embodiments

Hereinafter, preferred embodiments of the present invention are described below with reference to drawings. It is noted that a character with "^" or "−" on its top is expressed in this specification as "A^" or "A−" (where "A" is a character) for convenience.

(1) Outline of Driving Support System

FIG. 1 is a schematic configuration of a driving support system according to the present embodiment. The driving support system includes an in-vehicle device 1 that moves with a vehicle that is a moving body, a lidar (Lidar: Light Detection and Ranging, or Laser Illuminated Detection And Ranging) 2, a gyroscope sensor 3, a vehicle speed sensor 4, and a GPS receiver 5.

The in-vehicle device 1 is electrically connected to the lidar 2, the gyroscope sensor 3, the vehicle speed sensor 4, and the GPS receiver 5, and based on these outputs, estimates the position (also referred to as "own vehicle position") of the vehicle equipped with the in-vehicle device 1. Then, the in-vehicle device 1 performs autonomous driving control of the vehicle so as to travel along a route to the set destination based on the estimation result of the own vehicle position. The in-vehicle device 1 stores a map database (DB) 10 including voxel data "VD". The voxel data VD is data in which position information and the like of a stationary structure are recorded for each voxel that is a minimum unit of a three-dimensional space in a cube (normalized grid) shape. The voxel data VD includes data which expresses, by normal distribution with respect to each voxel, measured point cloud data of stationary structures, and is used for scan matching using NDT (Normal Distributions Transform), as will be described later. Further, while estimating the planar position and the yaw angle of the vehicle by NDT scan matching, the in-vehicle device 1 estimates the height position of the vehicle and at least one of the pitch angle or the roll angle, based on the voxel data VD.

The lidar 2 emits pulsed lasers for a predetermined angular range in the horizontal and vertical directions to thereby discretely measure the distance to an external object and then generates three-dimensional point cloud information indicating the position of the object. In this case, the lidar 2 includes: a radiation (emitting) unit for radiating (emitting) a laser beam while changing the irradiation (emitting) direction; a light receiving unit for receiving the reflected light (scattered light) which is the laser beam reflected by the object; and an output unit for outputting scan data (that is a point constituting point cloud data and is hereinafter referred to as "measurement point") based on the light receiving signal outputted by the light receiving unit. The measurement point is generated based on the irradiation direction corresponding to the laser beam received by the light receiving unit and the response delay time of the laser beam specified based on the above-described light receiving signal. In general, the closer the distance to the object is, the higher the accuracy of the distance measurement value outputted by the lidar becomes, and the farther the distance is, the lower the accuracy thereof becomes. The lidar 2, the gyroscope sensor 3, the vehicle speed sensor 4, and the GPS receiver 5 supplies the output data to the in-vehicle device 1, respectively.

The in-vehicle device 1 is an example of the "information processing device" in the present invention, and the lidar 2 is an example of the "measurement device" in the present invention. Incidentally, the driving support system, in place of or in addition to the gyroscope sensor 3, may have an inertial measurement unit (IMU) for measuring the acceleration and angular velocity of the vehicle in the three-axis direction.

(2) Configuration of In-Vehicle Device

Figure 2:
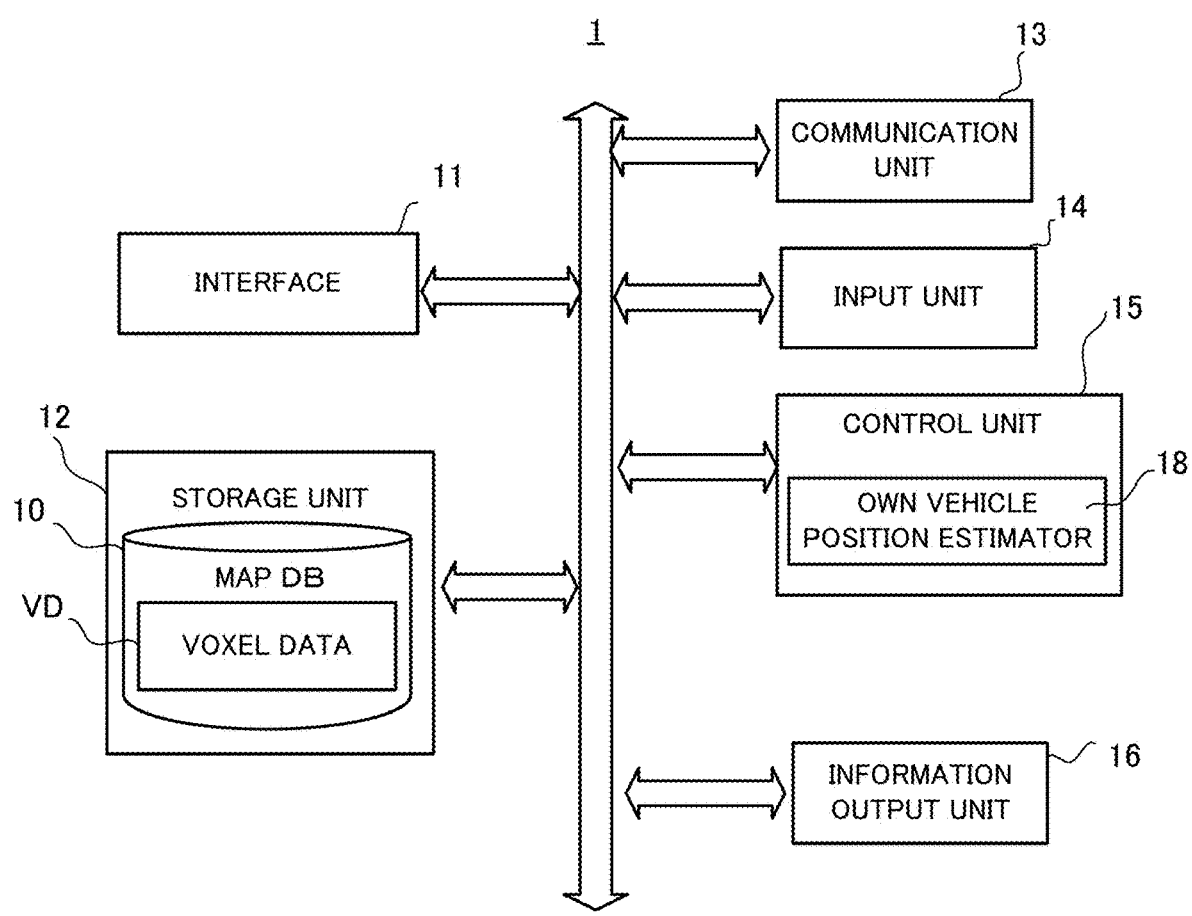
FIG. 2 is a block diagram showing a functional configuration of an in-vehicle device.

FIG. 2 is a block diagram showing a functional configuration of the in-vehicle device 1. The in-vehicle device 1 mainly includes an interface 11, a storage unit 12, a communication unit 13, an input unit 14, a control unit 15, and an information output unit 16. Each of these elements is connected to each other via a bus line.

The interface 11 acquires output data from sensors such as the lidar 2, the gyroscope sensor 3, the vehicle speed sensor 4, and the GPS receiver 5, and supplies the output data to the control unit 15. Further, the interface 11 supplies a signal relating to the driving control of the vehicle generated by the control unit 15 to the electronic control unit (ECU: Electronic Control Unit) of the vehicle.

The storage unit 12 stores a program to be executed by the control unit 15, and the information necessary for the control unit 15 to execute a predetermined process. In this example, the storage unit 12 stores the map DB 10 including the voxel data VD. The map DB 10 may be updated periodically. In this case, for example, the control unit 15 receives, via the communication unit 13, from the server device which manages the map information, the partial map information relating to the area to which the own vehicle position belongs, and reflects it into the map DB 10. Incidentally, the storage unit 12 may not store the map DB 10. In this case, for example, the control unit 15 communicates, via the communication unit 13, with a server device which stores the map data including the voxel data VD, and thereby acquires information necessary for the own vehicle position estimation processing or the like as necessary.

Examples of the input unit 14 include a button, a touch panel, a remote controller, a voice input device, which are provided for the user to operate. The input unit 14 accepts an input for specifying a destination for the route search, an input for specifying ON or OFF of the autonomous driving operation, and the like. The information output unit 16 is, for example, a display or a speaker or the like for outputting information based on the control of the control unit 15.

The control unit 15 includes a CPU or the like for executing a program, and controls the entire in-vehicle device 1. In this example, the control unit 15 includes an own vehicle position estimator 18. The control unit 15 is an example of the "acquisition unit", the "association unit", the "position estimation unit", the "calculation unit" and the "computer" configured to execute a program in the present invention.

The vehicle position estimator 18 estimates the own vehicle position by performing the NDT scan matching (scan matching based on NDT) based on point cloud data outputted from the lidar 2 and the voxel data VD corresponding to voxels to which the point cloud data belongs. Further, the own vehicle position estimator 18 calculates the reliability index for the result of the NDT scan matching, and repeatedly executes the NDT scan matching in the own vehicle position estimation based on the reliability index at the same processing time. This reliability index will be described later.

(3) Position Estimation Based on NDT Scan Matching

Figure 3:
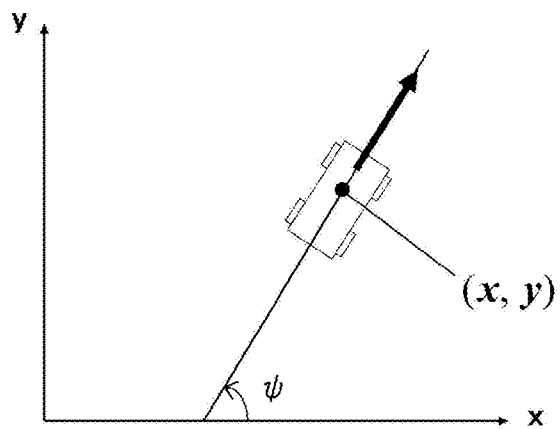
FIG. 3 is a diagram showing a state variable vector in two-dimensional orthogonal coordinates.

FIG. 3 is a diagram showing the own vehicle position to be estimated by the own vehicle position estimator 18 in two-dimensional orthogonal coordinates. As shown in FIG. 3, the own vehicle position on a plane defined in the two-dimensional orthogonal coordinates x-y is represented by the coordinates "(x, y)" and the orientation (yaw angle) "ψ" of the vehicle. Here, the yaw angle ψ is defined as the angle formed by the traveling direction of the vehicle and the x-axis. The coordinates (x, y) indicate, for example, an absolute position corresponding to the combination of latitude and longitude, or world coordinates indicating a position with respect to the predetermined origin. Then, the own vehicle position estimator 18 performs the own vehicle position estimation using these x, y, and ψ as estimation parameters. It is noted that the own vehicle position estimator 18 may perform the own vehicle position estimation to estimate not only x, y, and ψ but also at least one of the height position, the pitch angle, or the roll angle of the vehicle in the three-dimensional orthogonal coordinate system as the estimation parameters.

Next, the voxel data VD to be used for NDT scan matching will be described. The voxel data VD includes data representing the measured point cloud data of stationary structure(s) in each voxel by normal distribution.

Figure 4:
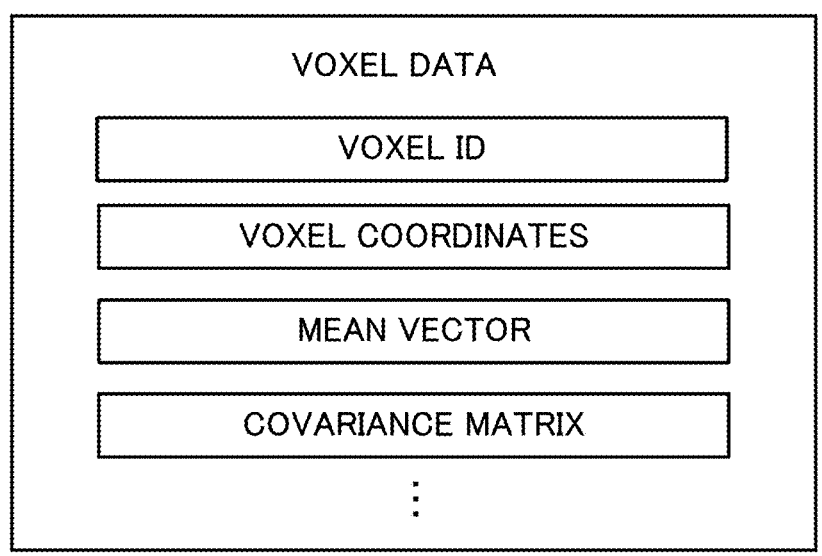
FIG. 4 illustrates an example of a schematic data structure of voxel data.

FIG. 4 shows an example of a schematic data structure of the voxel data VD. The voxel data VD includes information relating to parameters of the normal distribution for representing the point cloud in each voxel. According to the embodiment, as illustrated in FIG. 4, the voxel data VD includes the voxel ID, the voxel coordinates, the mean vector, and the covariance matrix. The "voxel coordinates" herein indicates three-dimensional absolute coordinates of the reference position (such as central position) of each voxel. It is noted that a voxel is each of cubes (or grids) into which the space is divided in a reticular pattern and the shape and the size thereof is preliminarily determined. Thus, it is possible to identify the space corresponding to each voxel by its voxel coordinates. It is also noted that the voxel coordinates may be used as a voxel ID.

The "mean vector" and "covariance matrix" indicate the mean vector and the covariance matrix corresponding to parameters of the normal distribution which represents the point cloud in a voxel of interest, respectively. Here, the coordinates of a point "i" in a voxel "n" are defined as follows.

$$X_n(i)=[x_n(i),y_n(i),z_n(i)]^T$$

Besides, if "$N_n$" denotes the number of point clouds in the voxel n, the mean vector "$\mu_n$" and the covariance matrix "$V_n$" in the voxel n are expressed by the following equations (1) and (2), respectively.

$$\mu_n = \begin{bmatrix} \overline{x}_n \\ \overline{y}_n \\ \overline{z}_n \end{bmatrix} = \frac{1}{N_n}\sum_{i=1}^{N_n} N_n(i) \quad (1)$$

$$V_n = \frac{1}{N_n-1}\sum_{i=1}^{N_n}\{X_n(i)-\mu_n\}\{X_n(i)-\mu_n\}^T \quad (2)$$

Next, an outline of the NDT scan matching using voxel data VD will be described.

In the NDT scan matching assuming a vehicle, the following estimation parameter P which includes the movement amount on the road plane (hereinafter referred to as x-y coordinates) and the orientation of the vehicle as elements is estimated.

$$P=[t_x,t_y,t_\psi]^T$$

Here, "$t_x$" indicates the moving amount in the x-direction, "$t_y$" indicates the moving amount in the y-direction, "$t_\psi$" indicates the yaw angle.

Here, the point cloud data obtained by the lidar 2 is associated with the voxels to be matched, and the coordinates of a point existing in the corresponding voxel n is expressed as follows.

$$X_L(j)=[x_n(j),y_n(j),z_n(j)]^T$$

Then, the mean value "$L'_n$" of $X_L$ (j) in the voxel n is expressed by the following equation (3).

$$L'_n = \begin{bmatrix} L'_x \\ L'_y \\ L'_z \end{bmatrix} = \frac{1}{N}\sum_{j=1}^{N} x_L(J) \quad (3)$$

When the mean value L' is coordinate-transformed using the above-described estimation parameter P, the coordinate "$L_n$" after the transformation is expressed by the following equation (4).

$$L_n = \begin{bmatrix} L_x \\ L_y \\ L_z \end{bmatrix} = \begin{bmatrix} \cos t_\psi & -\sin t_\psi & 0 \\ \sin t_\psi & \cos t_\psi & 0 \\ 0 & 0 & 1 \end{bmatrix}\begin{bmatrix} L'_x \\ L'_y \\ L'_z \end{bmatrix} + \begin{bmatrix} t_x \\ t_y \\ 0 \end{bmatrix} \quad (4)$$

By using the point cloud data converted into data in the absolute coordinate system (also referred to as "world coordinate system") which is the same coordinate system as the map DB 10, and the mean vector $\mu_n$ and the covariance matrix $V_n$ included in the voxel data VD, the in-vehicle device 1 calculates an evaluation function value (also referred to as "individual evaluation function value") "$E_n$" for the voxel n. In this case, the in-vehicle device 1 calculates the individual evaluation function value $E_n$ for the voxel n based on the following equation (5).

$$E_n = \exp\left\{-\frac{1}{2}(L_n - \mu_n)^T V_n^{-1}(L_n - \mu_n)\right\} \quad (5)$$

Then, the in-vehicle device 1 calculates the total evaluation function value (also referred to as "score value E (k)") for all voxels to be matched as shown by the following equation (6).

$$E(k) = \sum_{n=1}^{M} E_n = E_1 + E_2 + \ldots + E_M \quad (6)$$

Thereafter, through an arbitrary root finding algorithm such as Newton method, the in-vehicle device 1 calculates the estimation parameter P at which the score value E (k) is maximized. Then, by applying the estimation parameter P to the predicted vehicle position "$X^-$ (k)" tentatively calculated by the dead reckoning, the in-vehicle device 1 calculates the accurately-estimated own vehicle position "$X^\wedge$ (k)" using the following equation (7).

$$\hat{X}(k) = \overline{X}(k) + P \quad (7)$$

Here, the state variable vector indicating the own vehicle position at the target reference time of calculation (i.e., the current time) "k" is denoted as "$X^-$ (k)" or "$X^\wedge$ (k)".

Figure 5:
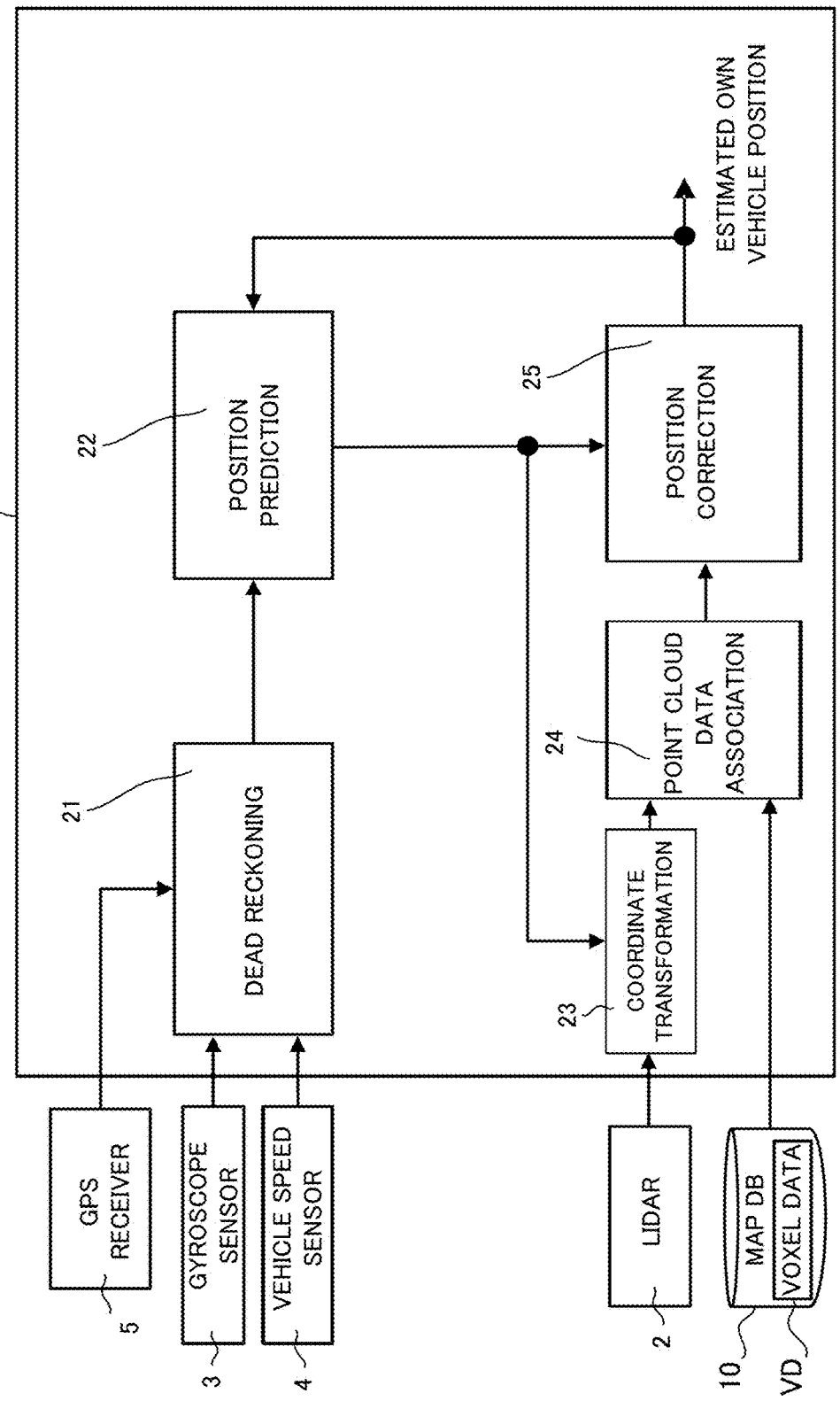
FIG. 5 illustrates an example of a functional block of the own vehicle position estimator.

FIG. 5 is an example of a functional block of the own vehicle position estimator 18. As shown in FIG. 5, the own vehicle position estimator 18 includes a dead reckoning block 21, a position prediction block 22, a coordinate transformation block 23, a point cloud data association block 24, and a position correction block 25.

The dead reckoning block 21 uses the movement speed and angular velocity of the vehicle based on the output of the gyroscope sensor 3, the vehicle speed sensor 4, and the GPS receiver 5 and the like, to determine the movement distance and orientation change from the previous time. The position prediction block 22 calculates the predicted vehicle position $X^-$ (k) at the time k by adding the calculated movement distance and orientation change to the estimated own vehicle position $X^\wedge$ (k−1) at the time k−1 calculated at the immediately preceding step.

The coordinate transformation block 23 converts the point cloud data outputted from the lidar 2 into data in the world coordinate system that is the same coordinate system as the coordinate system adopted in the map DB 10. In this case, the coordinate transformation block 23, for example, performs the coordinate transformation of the point cloud data outputted by the lidar 2 at time k based on the predicted vehicle position outputted by the position prediction block 22 at time k.

The point group data association block 24 associates the point cloud data with the voxels by performing the matching between the point cloud data in the world coordinate system outputted by the coordinate transformation block 23 and the voxel data VD represented by the same world coordinate system. The position correction block 25 calculates the individual evaluation function value according to the equation (5) for each voxel which is associated with the point cloud data, and calculates the estimation parameter P at which the score value E (k) according to the equation (6) becomes the maximum. Then, the position correction block 25 calculates the estimated vehicle position $X^\wedge$ (k) according to the equation (7) by applying the estimation parameter P obtained at time k to the predicted vehicle position $X^-$ (k) outputted by the position prediction block 22.

(4) Calculation of Reliability Index of NDT Scan Matching

Next, the calculation of the reliability index for the result of NDT scan matching. Thereafter, the overall number of measurement points constituting the point cloud data outputted (i.e., obtained in one cycle of scanning) by the lidar 2 at each time is referred to as "measurement point number Nt".

For the point cloud data obtained at each time, the own vehicle position estimator 18 calculates the measurement point number Nt and the number (also referred to as "associated measurement point number Nc") of measurement points associated with the voxel data VD in NDT scan matching, respectively. Then, the own vehicle position estimator 18 calculates the ratio (also referred to as "DAR: Data Association Ratio") of the associated measurement point number Nc to the measurement point number Nt is calculated as a reliability index in the NDT scan matching. Namely, the own vehicle position estimator 18 calculates the DAR according to the following equation.

DAR=Nc/Nt

Here, a specific example of calculation of the DAR will be described with reference to FIGS. 6 and 7.

Figure 6:
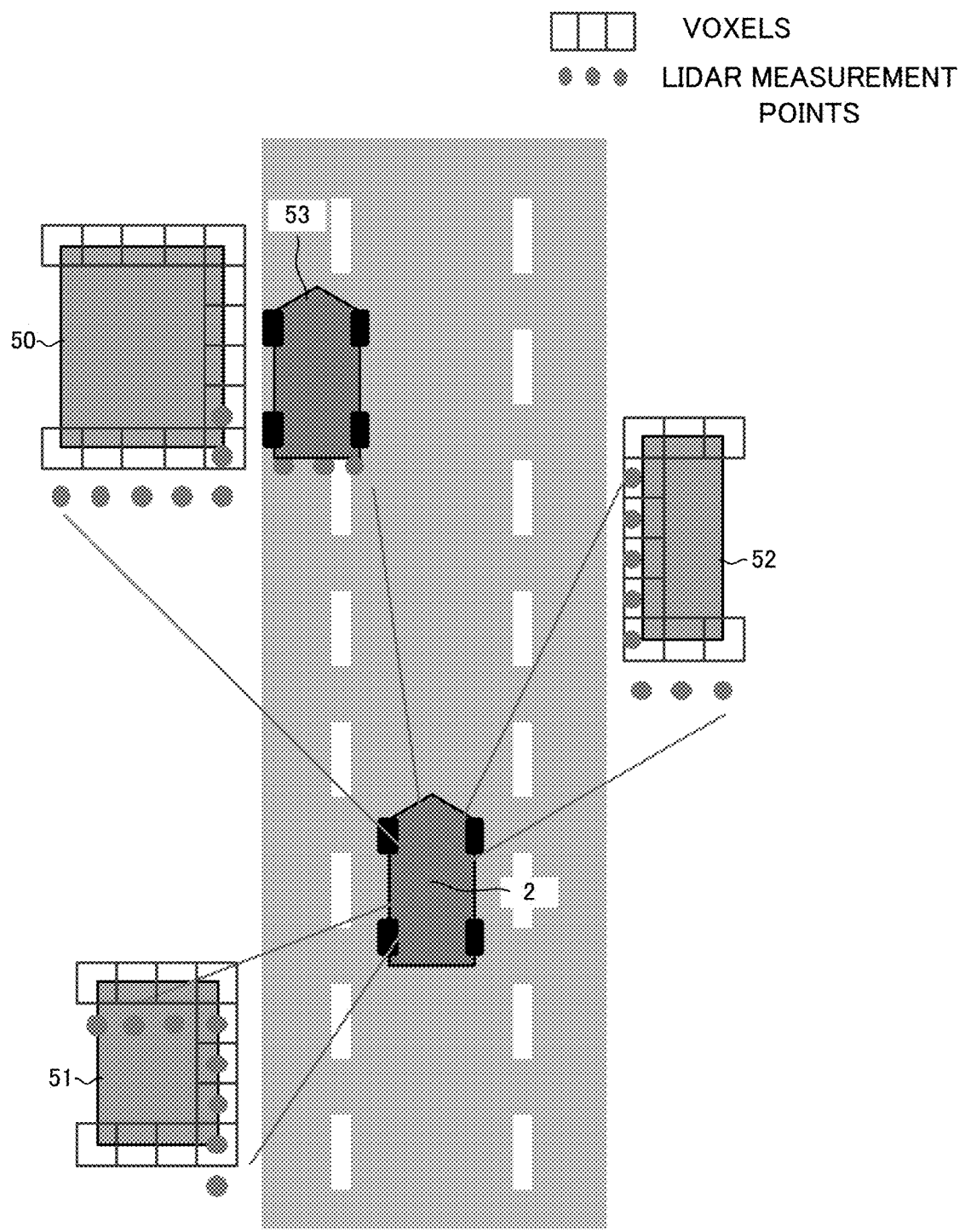
FIG. 6 illustrates a plane view of the vicinity of a vehicle equipped with an in-vehicle device.
Figure 7:
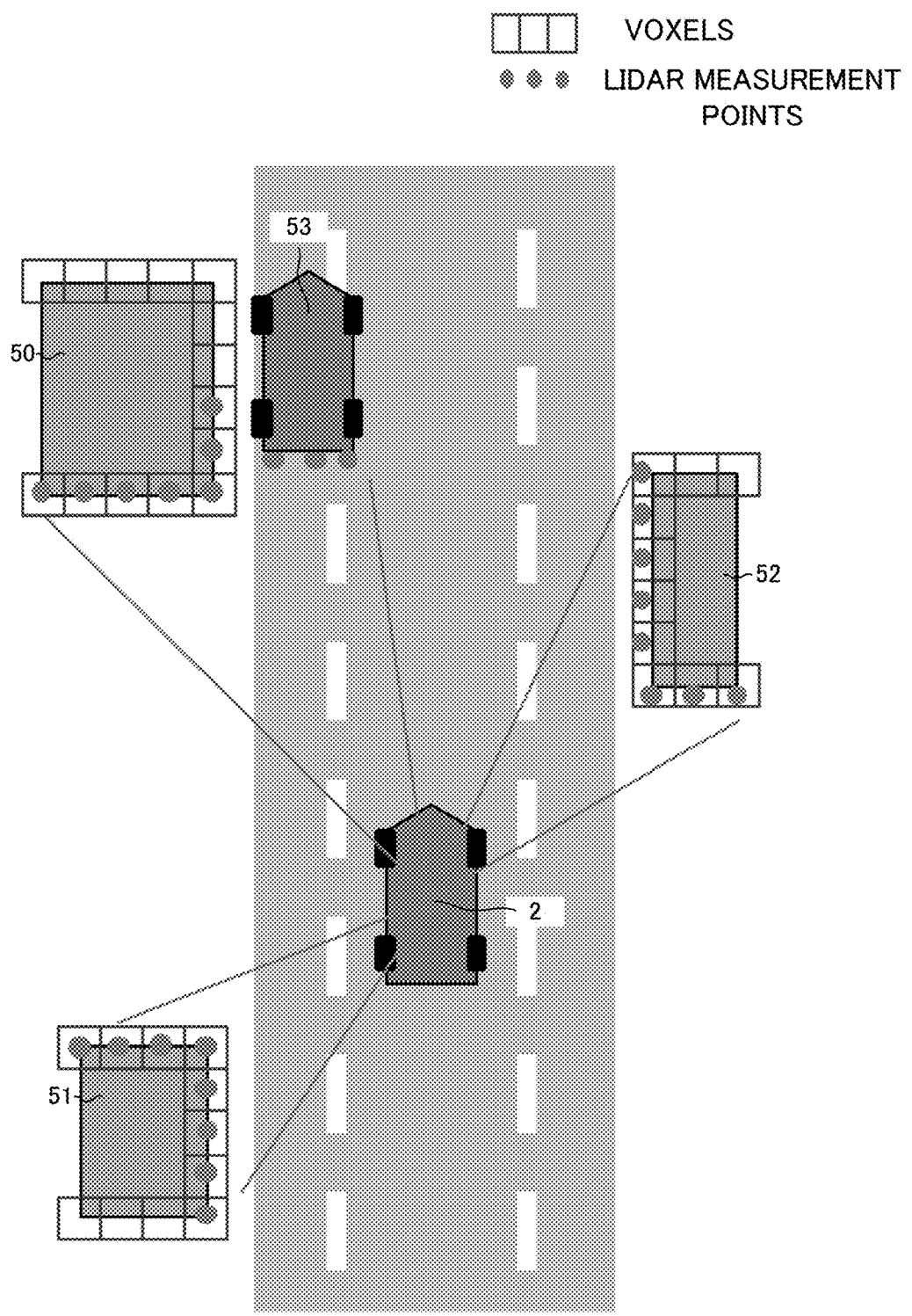
FIG. 7 illustrates a plane view of the vicinity of a vehicle equipped with an in-vehicle device.

FIGS. 6 and 7 each shows a plane view of the vicinity of the vehicle equipped with the in-vehicle device 1. In FIGS. 6 and 7, voxels which have the corresponding voxel data VD are shown by rectangular frames, the positions of the measurement points measured by the lidar 2 in the one cycle of the scanning are indicated by dots. Here, FIG. 6 shows an example in the case where the association between the measurement points and the voxel data VD is not accurately performed by the point cloud data association block 24, and FIG. 7 shows an example in the case where the association between the measurement points and the voxel data VD is accurately performed by the point cloud data association block 24. In the example of FIG. 6, features 50 to 52 exist around the vehicle equipped with the in-vehicle device 1, and voxel data VD is provided in voxels corresponding to the surface positions of the features 50 to 52. In addition, there is a preceding vehicle 53 in front of the vehicle equipped with the in-vehicle device 1, and the in-vehicle device 1 generates 26 measurement points for the feature 50 to 52 and the preceding vehicle 53 in one cycle of scanning by the lidar 2. In FIGS. 6 and 7, for convenience of explanation, although only one measurement point is associated at most with one voxel, a plurality of measurement points may be associated with one voxel, in reality.

Here, in the example of FIG. 6, there is a deviation in the association between the measurement points and the voxel data VD performed by the point cloud data association block 24. In this case, there are two measurement points of the feature 50 associated with the voxel data VD, there are four measurement points of the feature 51 associated with the voxel data VD, there are five measurement points of the feature 52 associated with the voxel data VD. Therefore, in this case, the own vehicle position estimator 18 determines that the DAR is about 0.423 (that approximates 11/26) since the associated measurement point number Nc is 11 and the measurement point number Nt is 26.

On the other hand, in the example of FIG. 7, the association between the measurement points and the voxel data VD is performed accurately by the point cloud data association block 24. Then, in this case, there are seven measurement points of the feature 50 associated with the voxel data VD, there are eight measurement points of the feature 51 associated with the voxel data VD, eight measurement points of the feature 52 associated with the voxel data VD. Therefore, in this case, the own vehicle position estimator 18 determines that the DAR is about 0.885 (that approximates 23/26) since the associated measurement point number Nc is 23 and the measurement point number Nt is 26.

In this way, the DAR becomes a low value when the association between the measurement points and the voxel data VD preformed by the point cloud data association block 24 is not sufficient (i.e., when the deviation has occurred). In contrast, the DAR becomes a high value when the association between the measurement points and the voxel data VD performed by the point cloud data association block 24 is sufficiently performed (i.e., when the deviation does not occur). Therefore, by calculating the DAR, the own vehicle position estimator 18 can obtain an index that accurately reflects the reliability of the calculated estimation parameter P.

Here, a supplementary description will be given of a specific procedure of associating the measurement points with the voxel data VD.

Figure 8:
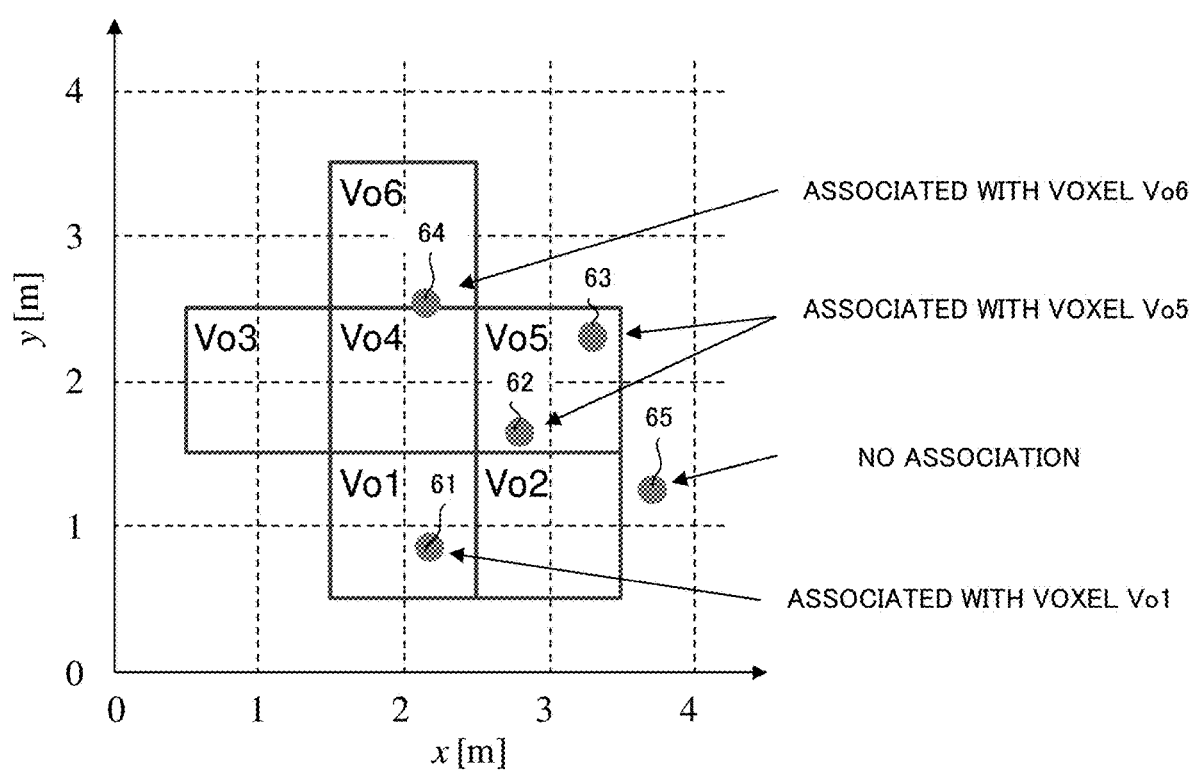
FIG. 8 illustrates the positional relation between voxels associated with voxel data and measurement points indicating positions near the voxels on a two-dimensional plane in the world coordinate system.

FIG. 8 shows the positional relation on the two-dimensional x-y plane in the world coordinate system between voxels "Vo1" to "Vo6" which have corresponding voxel data VD and the measurement points 61 to 65 indicative of the positions near these voxels. Here, for convenience of explanation, it is assumed that the z-coordinate of the center position of the voxels Vo1 to Vo6 in the world coordinate system and the z-coordinate of the measurement points 61 to 65 in the world coordinate system are the same.

First, the coordinate transformation block 23 converts the point cloud data including the measurement points 61 to 65 outputted by the lidar 2 to data in the world coordinate system. Thereafter, the point cloud data association block 24 performs rounding processing as to the fractions of the measurement points 61 to 65 in the world coordinate system. In the example of FIG. 8, since the size of each voxel that is a cube is 1 meter, the point cloud data association block 24 rounds off each decimal point of x, y, z coordinates of each measurement point 61 to 65.

Next, the point cloud data association block 24 determines the voxels corresponding to the respective measurement points 61 to 65 by matching between the voxel data VD corresponding to the voxels Vo1 to Vo6 and the coordinates of the respective measurement points 61 to 65. In the example of FIG. 8, (x, y) coordinates of the measurement point 61 becomes (2, 1) after the above-described rounding, the point cloud data association block 24 associates the measurement point 61 with the voxel Vo1. Similarly, (x, y) coordinates of the measurement point 62 and the measurement point 63 become (3, 2) after the above-described rounding, the point cloud data association block 24 associates the measurement point 62 and the measurement point 63 with the voxel VoS. Further, (x, y) coordinates of the measurement point 64 becomes (2, 3) after the above-described rounding, the point cloud data association block 24 associates the measurement point 64 with the voxel Vo6. On the other hand, (x, y) coordinates of the measurement point 65 becomes (4, 1) after the above-described rounding, the point cloud data association block 24 determines that there is no voxel data VD corresponding to the measurement point 65. Thereafter, the position correction block 25 performs estimation of the estimation parameter P using the measurement points and the voxel data VD associated by the point cloud data association block 24.

(5) Own Vehicle Position Estimation with DAR

Next, the own vehicle position estimation processing using the DAR will be described.

(5-1) Overview

At each processing time when the vehicle position estimation is performed, if the DAR is lower than a predetermined threshold value, the own vehicle position estimator 18 determines that the estimation parameter P may be a local solution, and performs re-search of the estimation parameter P in which the calculated estimation parameter P is set as the initial value. Thus, the own vehicle position estimator 18 suitably calculates the estimation parameter P to be the optimal solution at each processing time by determining whether or not to execute the re-search of the estimation parameter P based on the DAR.

FIGS. 9A to 9D are graphs showing the relation between the value of the estimation parameter P and the score value. Here, for convenience of explanation, the estimation parameter P is expressed as a one-dimensional value. Here, FIGS. 9A to 9D show the first to fourth search results, each of which is obtained when the search range is set for the estimation parameter P at each target processing time, and the initial values at the start of the searches, respectively. Further, FIGS. 10A to 10D schematically illustrate the correspondence between the measurement points in the world coordinate system to which the initial values of the estimation parameter P and the search results shown in FIGS. 9A to 9D are respectively applied and the actual positions of the measured features. In FIG. 10A to 10D, for convenience of explanation, the positions of the stationary structures including the feature 71 and the feature 72 registered in the voxel data VD are indicated by solid line, the positions of the voxels which have corresponding voxel data VD are indicated by broken line frames, and the measurement points are indicated by dots.

Figure 9A:
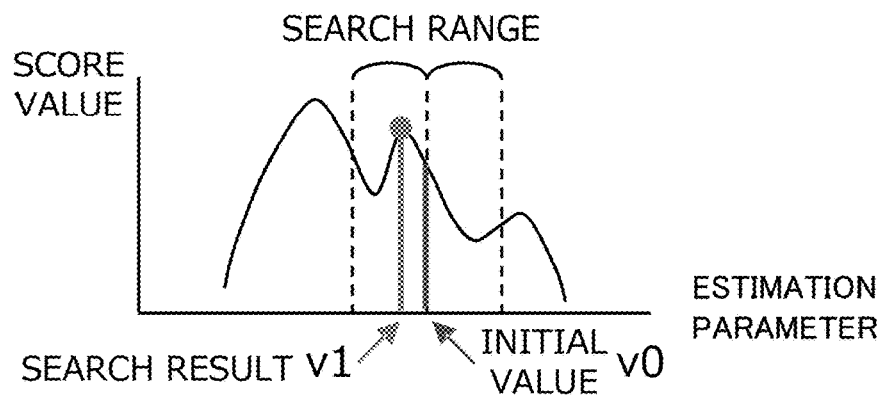
FIGS. 9A to 9D each is a graph showing the relation between the estimation parameter value and the score value.
Figure 10A:
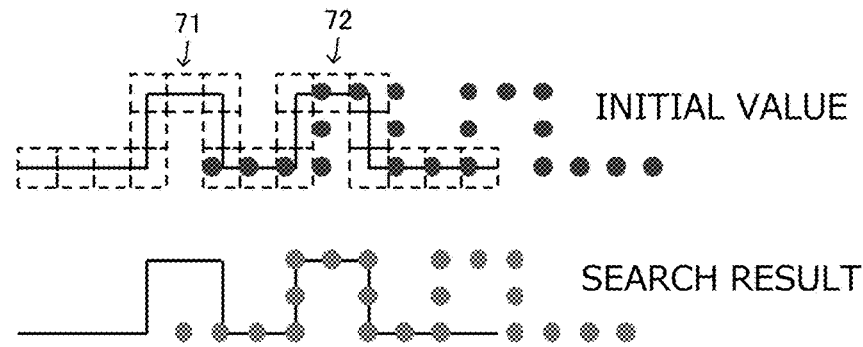
FIGS. 10A to 10D each schematically illustrates the correspondence between the actual position of the measured feature and measurement points in the world coordinate system to which the initial value and the search results of the estimation parameter shown in FIGS. 9A to 9D are respectively applied.

Here, in the estimation processing of the first estimation parameter P shown in FIG. 9A, the own vehicle position estimator 18 sets the search range of the estimation parameter P to a value range with a predetermined length (width) centered on a predetermined initial value "v0" (for example, 0), and searches for the estimation parameter P in which the score value (that is, the evaluation function value E) becomes the maximum in the search range. In this case, the own vehicle position estimator 18 recognizes the value "v1" of the estimation parameter P in which the score value is highest within the set search range as the search result. Further, the own vehicle position estimator 18 calculates the DAR for the point cloud data in the world coordinate system in which the search result v1 is reflected, by counting the associated measurement point number Nc according to the procedure described with reference to FIG. 8. In this case, as shown in FIG. 10A, the own vehicle position estimator 18 determines that the DAR is about 0.524 (which approximates 11/21) since the measurement point number Nt is 21 and the associated measurement point number Nc that is the number of points on the solid line is 11.

Then, the own vehicle position estimator 18 determines whether or not the calculated DAR is equal to or larger than a predetermined threshold value (here, referred to as "0.8"). For example, the above-described threshold value is set to the lower limit value of the DAR at which the estimation parameter P can be estimated to be the optimal solution, and it is previously stored in the unit 12 or the like. Then, in the example of FIG. 9A, since the calculated DAR (approximately 0.524) is less than the threshold value, the own vehicle position estimator 18 determines that the calculated estimation parameter P is falling into the local solution, or that occlusion due to a dynamic object such as another vehicle is occurring with respect to the feature to be measured. Therefore, in this case, the own vehicle position estimator 18 executes the search processing of the estimation parameter P, which uses the first search result as the initial value, again. As shown in FIG. 9A, the search range set in the first search does not include the optimal solution in which the score value becomes the maximum, and the search result v1 is a local solution.

Figure 9B:
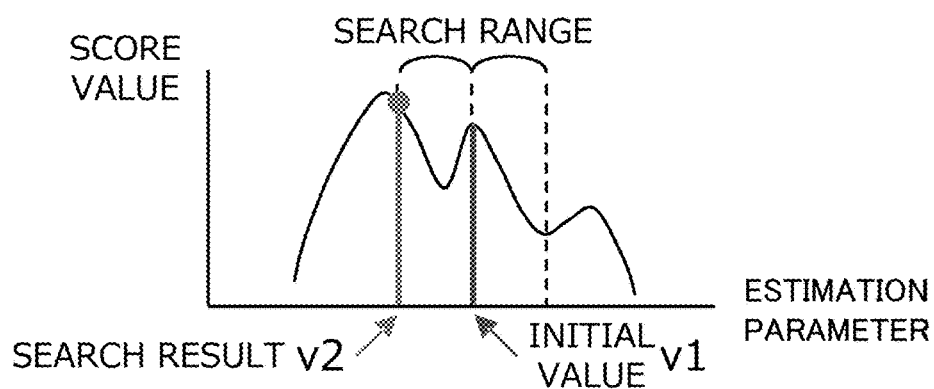
Figure 9C:
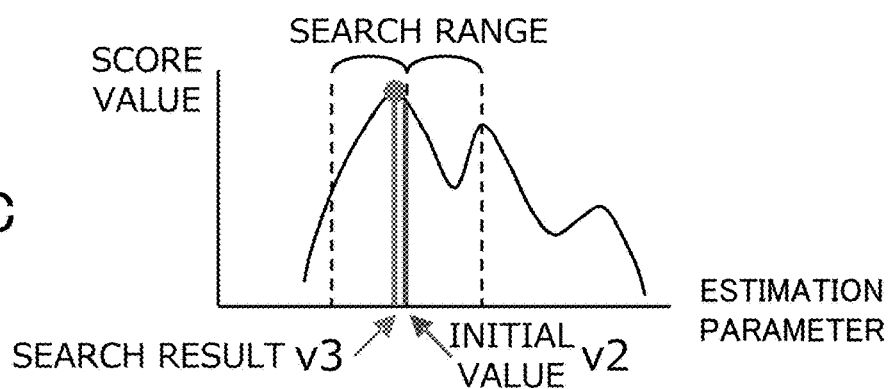
Figure 10B:
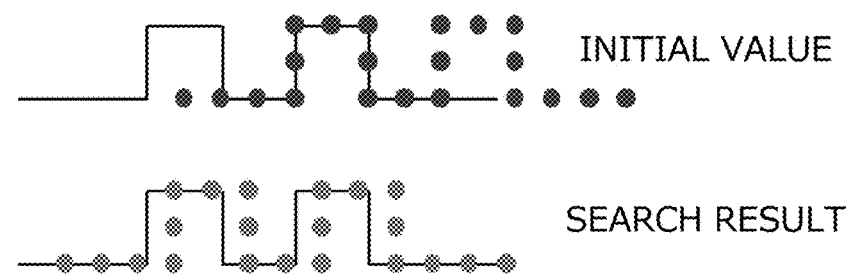
Figure 10C:
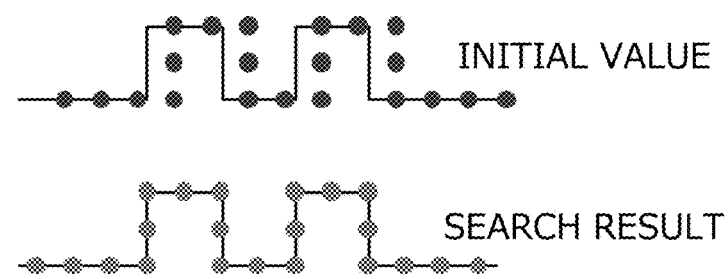

Next, the own vehicle position estimator 18 performs the estimation processing of the second estimation parameter P in which the estimation parameter P searched for at the first time is set as the initial value and the length of the search range is set to be the same as the length of the search range at the first time. In this case, as shown in FIG. 9B, the own vehicle position estimator 18 determines the initial value of the estimation parameter P to be the same value v1 as the first search result and acquires the second search result "v2" of the estimation parameter P. Then, in this case, as shown in FIG. 10B, the own vehicle position estimator 18 determines that the DAR is about 0.619 (which approximates 13/21) since the measurement point number Nt is 21 and the associated measurement point number Nc is 13. Therefore, since the DAR is less than the threshold value, the own vehicle position estimator 18 performs the third search processing of the estimation parameter P using the estimation parameter P obtained in the second estimation processing of the estimation parameter P as the initial value. In this case, as shown in FIG. 9C, the own vehicle position estimator 18 determines the initial value of the estimation parameter P to be the same value v2 as the second search result and acquires the second search result "v3" of the estimation parameter P. Then, in this case, as shown in FIG. 10C, the own vehicle position estimator 18 determines that the DAR is equal to or larger than the threshold value (i.e., 1>0.8) since the measurement point number Nt is 21 and the associated measurement point number Nc is 21. Therefore, in this case, the own vehicle position estimator 18 determines that the latest estimation parameter P is an optimal solution rather than a local solution.

Figure 9D:
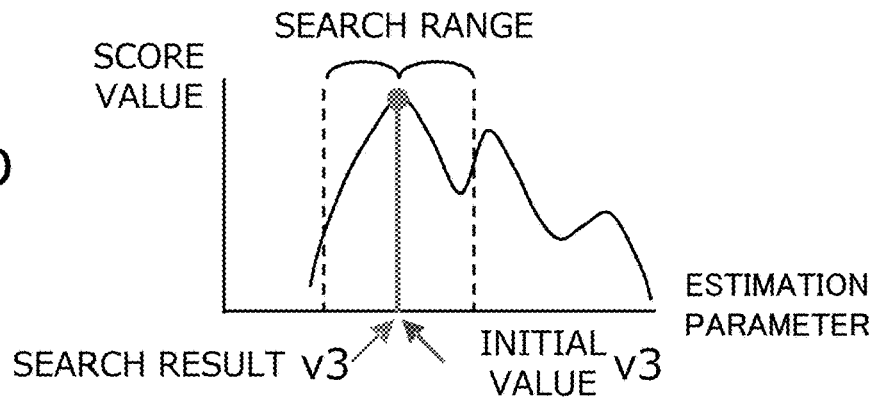
Figure 10D:
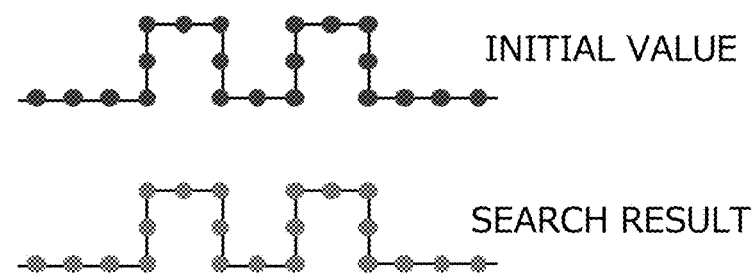

If the search processing of the fourth estimation parameter P is performed using the estimation parameter P searched for at the third time as the initial value, the search result of the estimation parameter P will become the same value v3 as the initial value as shown in FIG. 9D. In this case, as shown in FIG. 10D, the DAR also remains unchanged as 1.

As described above, the own vehicle position estimator 18 repeatedly executes the search processing of the estimation parameter P that uses the estimation parameter P estimated immediately before as the initial value until the DAR becomes equal to or larger than a predetermined threshold value. Accordingly, the own vehicle position estimator 18 repeats the search of the estimation parameter P by the necessary number of times while varying the search range of the estimation parameter P. Thereby, it is possible to suitably acquire the optimal solution of the estimation parameter P. Further, the own vehicle position estimator 18 can suitably suppress an increase in processing cost as compared with a process of searching for an optimal solution of the estimation parameter P by expanding the length (width) of the search range.

In the explanation using FIGS. 9A to 9D and FIGS. 10A to 10D, an example that determining whether or not re-search of the estimation parameter P is required is made by comparing the DAR after the reflection of the searched estimation parameter P to the point cloud data with the threshold value. Alternatively, the own vehicle position estimator 18 may determine whether or not re-search of the estimation parameter P is required by comparing the the DAR before the reflection of the searched estimation parameter P to the point cloud data with the threshold value.

In addition, in some embodiments, the own vehicle position estimator 18 may terminate the search of the estimation parameter P if there is no variation in the DAR before after the research of the estimation parameter P, instead of or in addition to terminating the search of the estimation parameter P if the DAR is equal to or larger than the threshold. In this case, the own vehicle position estimator 18 executes the search of the estimation parameter P in which the estimation parameter P estimated immediately before is set as the initial value. Then, if the DAR before the search and the DAR after the search is the same (i.e., if there is no variation in the estimation parameter P), the vehicle position estimator 18 terminates the search of the estimation parameter P. Thereby, the own vehicle position estimator 18 can also suitably determine the optimal solution as the estimation parameter P.

In another embodiment, the own vehicle position estimator 18 may determine the end of the search for the estimation parameter P based on the upper limit number of times to search for the estimation parameter P in place of or in addition to determining the end of the search for the estimation parameter P based on the DAR described above. For example, the own vehicle position estimator 18 presets the upper limit number (also referred to as the "search upper limit number") of times to perform the estimation processing of the estimation parameter P. Then, if the number of times to perform the estimation processing of the estimation parameter P reaches the search upper limit number, the own vehicle position estimator 18 terminates the estimation processing of the estimation parameter P regardless of the DAR. Thereby, it is possible to suitably prevent the processing time from exceeding a predetermined time interval of the estimation processing of the own vehicle position. Specific examples of this process will be described with reference to FIG. 12.

In addition, instead of determining whether or not the re-search of the estimation parameter P is required each time the search of the estimation parameter P is performed, the own vehicle position estimator 18 may determine the number of times to search for the estimation parameter P based on the DAR before the estimation parameter P is estimated. Specific examples of this process will be described with reference to FIG. 13.

Here, a supplementary explanation will be given of the case where occlusion is occurring.

Figure 11:
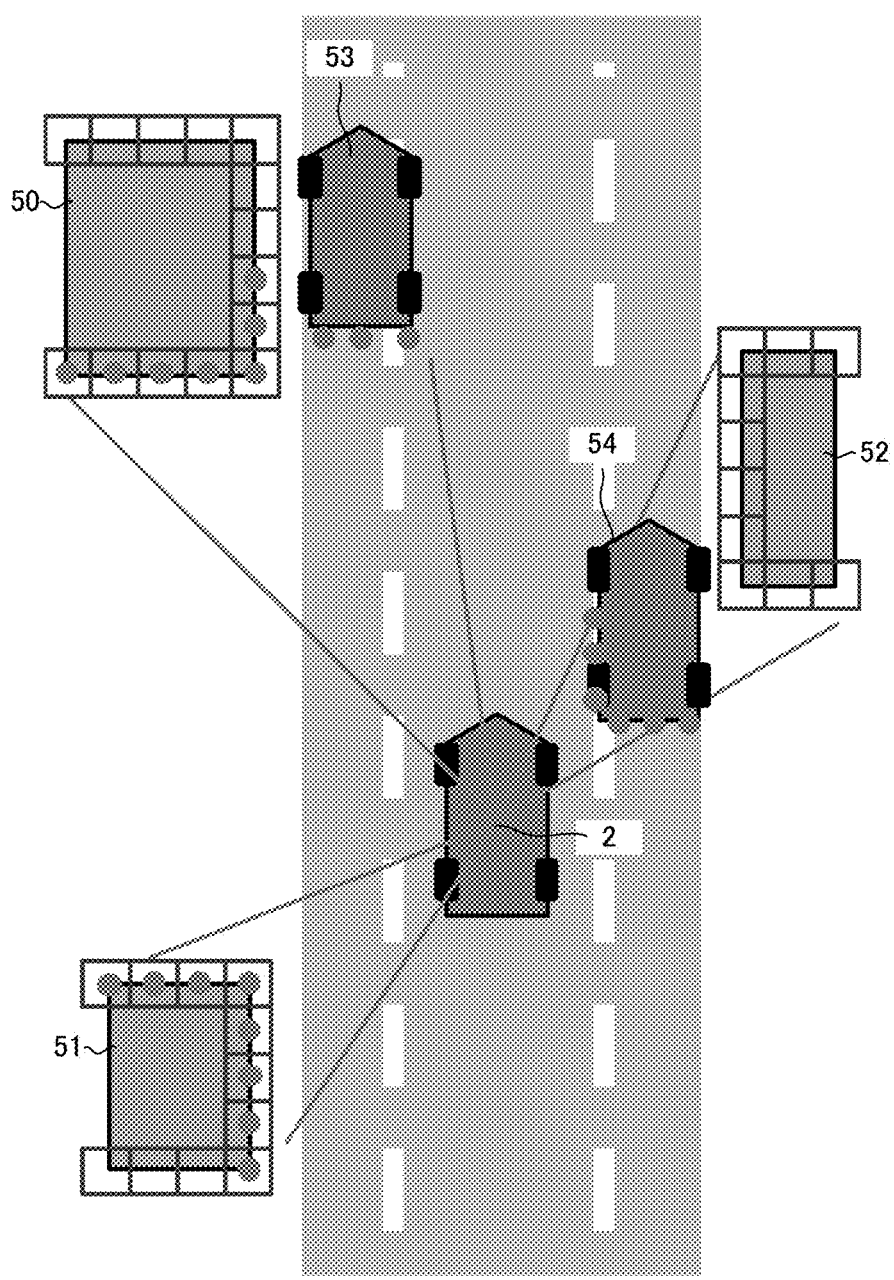
FIG. 11 illustrates a plane view of the vicinity of the vehicle when the DAR does not reach the threshold due to occlusion.

FIG. 11 shows a plane view of the vicinity of the vehicle mounting the in-vehicle device 1 when the DAR does not reach the threshold due to occlusion. In the example of FIG. 11, while occlusion for the feature 50 is caused by the vehicle 53, occlusion of the feature 52 is caused by the vehicle 54. Therefore, in this case, the DAR becomes 0.625 (=15/24), and the DAR is equal to or less than the threshold value. In this way, the DAR decreases with the decrease in the number of measurement points associated with voxel data VD due to occlusion. On the other hand, in such a case where the DAR is lowered due to the occlusion in this way, unlike the case where the estimation parameter P falls into the local solution, the estimation parameters P and DAR obtained do not change even when the estimation process of the estimation parameter P is repeatedly performed. Therefore, when the estimation parameters P and the DAR do not change while the DAR is less than the threshold value, the own vehicle position estimator 18 determines that occlusion has occurred and terminates the search for the estimation parameter P.

(5-2) Processing Flow

Figure 12:
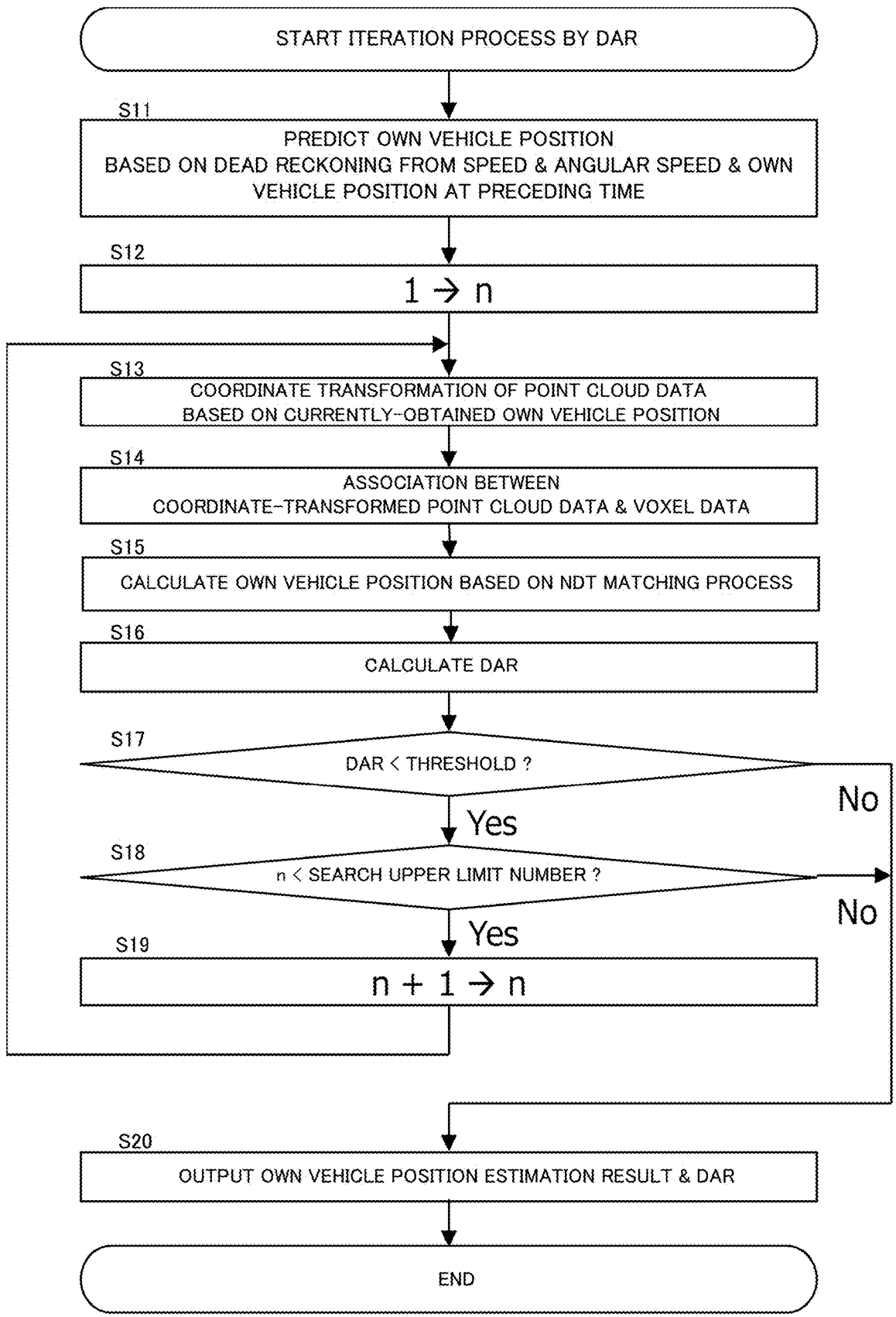
FIG. 12 illustrates an example of a flowchart showing a procedure of the own vehicle position estimation process for determining whether or not to re-search for the estimation parameter based on the DAR each time the estimation parameter is estimated.

FIG. 12 is an example of a flowchart showing the procedure of the own vehicle position estimation process for determining whether or not the re-search of the estimation parameter P is required based on the DAR each time the estimation parameter P is estimated. In the flowchart of FIG. 12, the own vehicle position estimator 18 repeatedly executes the search of the estimation parameter P until the DAR after reflecting the estimation parameter P becomes equal to or larger than the threshold value or until the number of times to have searched for the estimation parameter P reaches the search upper limit number.

First, the dead reckoning block 21 of the own vehicle position estimator 18 calculates the movement distance and the orientation change of the vehicle from the previous time by using the movement speed and the angular velocity of the vehicle based on the output of the gyroscope sensor 3, the vehicle speed sensor 4, and the GPS receiver 5. Thereby, the position prediction block 22 calculates the predicted own vehicle position at the current time from the estimated own vehicle position (which may include an attitude angle such as a yaw angle) obtained at the preceding time (i.e., the processing time immediately before) (step S11). Then, the own vehicle position estimator 18 sets the variable "n" representing the number of times to have searched for the estimation parameter P to 1 (step S12).

Next, the coordinate transformation block 23 of the own vehicle position estimator 18 converts the point cloud data in one cycle of scanning by the lidar 2 at the current processing time into data in the world coordinate system (step S13). In this case, for example, the coordinate transformation block 23 converts the point cloud data indicating three-dimensional positions with reference to the lidar 2 to data in the vehicle coordinate system, wherein the three-dimensional positions are expressed by combinations of the distance measured by the lidar 2 and the scan angle. The vehicle coordinate system is the coordinate system of the vehicle whose axes are along the traveling direction and the lateral direction of the vehicle. In this case, based on the information of the installation position and installation angle of the lidar 2 to the vehicle, the coordinate transformation block 23 converts the point cloud data in the coordinate system with respect to the lidar 2 to data in the vehicle coordinate system. Then, based on predicted or estimated vehicle position x, y and yaw angle $\psi$ and the like, the coordinate transformation block 23 further converts the converted point cloud data in the vehicle coordinate system to data in the world coordinate system. Examples of the process of converting the point cloud data outputted by a lidar installed in the vehicle to data in the vehicle coordinate system, and the process of converting data in the vehicle coordinate system to data in the world coordinate system are disclosed in WO2019/188745.

Next, the point cloud data association block 24 associates the converted point cloud data in the world coordinate system with voxels which have corresponding voxel data VD (step S14). Then, the position correction block 25 of the own vehicle position estimator 18 performs NDT matching based on the voxel data VD of the associated voxels and the point cloud data, and calculates the estimated vehicle position (including attitude angles such as a yaw angle) at the current processing time (step S15). Further, the own vehicle position estimator 18 calculates the DAR by counting the measurement point number Nt and associated measurement point number Nc (step S16).

Then, the own vehicle position estimator 18 determines whether or not the DAR calculated at step S16 is less than a predetermined threshold value (step S17). If the DAR is less than the threshold value (step S17; Yes), the own vehicle position estimator 18 determines whether or not the variable n representing the number of times to have searched for the estimation parameter P is less than the search upper limit number (step S18). If the variable n representing the number of times to have searched for the estimation parameter P is less than the search upper limit number (step S18; Yes), the own vehicle position estimator 18 adds the variable n by 1 (step S19). Thereafter, the own vehicle position estimator 18 proceeds to step S13, and executes the coordinate transformation of the point cloud data that is the processing target in the current processing time to data in the world coordinate system based on the own vehicle position calculated at step S15.

On the other hand, if the DAR is equal to or larger than the predetermined threshold value (step S17; No), or if the variable n has reached the search upper limit number (step S18; No), the own vehicle position estimator 18 outputs the latest vehicle position estimation result calculated at step S15 and the DAR (step S20). In this case, the own vehicle position estimator 18 outputs the vehicle position estimation result and the DAR to a process block in the control unit 15 or the like configured to perform driving assistance such as autonomous driving.

As described above, the own vehicle position estimator 18 determines whether or not the re-search of the estimation parameter P is required based on the DAR each time the estimation parameter P is estimated. Thereby, it is possible to execute the iteration of the search of the estimation parameter P only when it is necessary, and thus it is possible to avoid the unnecessary repetition of the search of the estimation parameter P. Thus, the own vehicle position estimator 18 can suitably complete the vehicle position estimation within a predetermined time.

Figure 13:
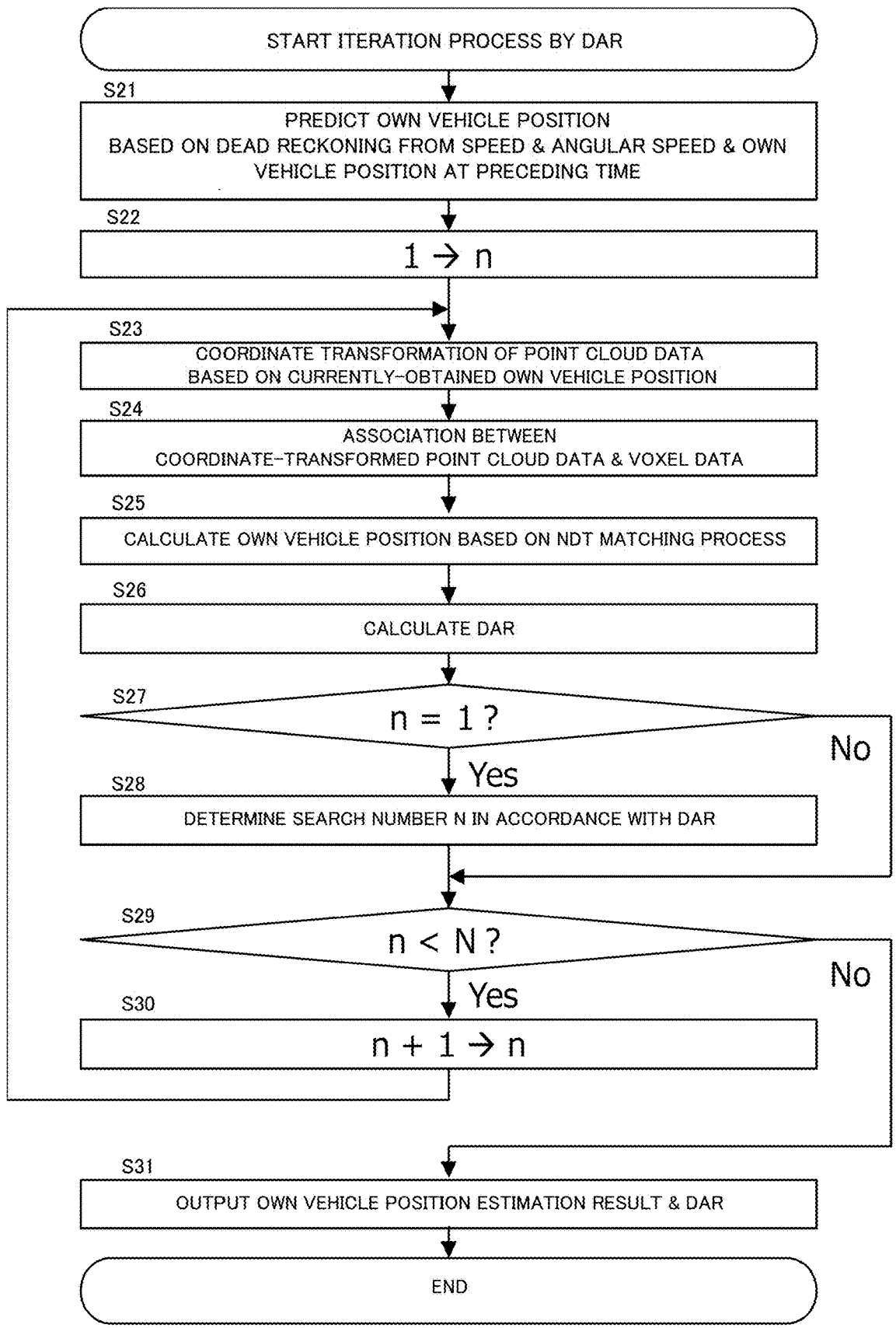
FIG. 13 illustrates an example of a flowchart showing a procedure of the own vehicle position estimation process for determining the number of times to perform the search of the estimation parameter based on the DAR.

FIG. 13 is an example of a flowchart showing the procedure of the own vehicle position estimation processing for determining the number of times (also referred to as the "search number N") to perform the search of the estimation parameter P based on the DAR. In the flowchart of FIG. 13, the own vehicle position estimator 18 sets the search number N according to the DAR calculated based on the association between the voxel data VD and the point cloud data outputted by the lidar 2 which is coordinate-transformed based on the predicted vehicle position before estimating the estimation parameter P.

First, the dead reckoning block 21 and the position prediction block 22 of the own vehicle position estimator 18 calculate the predicted vehicle position at the current processing time from the estimated vehicle position obtained at preceding processing time in the same way as step S11 in FIG. 12 (step S21). Then, the own vehicle position estimator 18 sets the variable n representing the number of times to have searched for the estimation parameter P to 1 (step S22). Next, the coordinate transformation block 23 of the own vehicle position estimator 18, in the same way as step S13 in FIG. 12, converts the point cloud data generated in one cycle of scanning by the lidar 2 at the current processing time to the data in the world coordinate system (step S23).

Next, the point cloud data association block 24 performs the association between the converted point cloud data in the world coordinate system and the voxels which have corresponding voxel data VD (step S24). Then, the position correction block 25 of the own vehicle position estimator 18 performs the NDT matching based on the point cloud data and the voxel data VD of the associated voxels, and calculates the estimated own vehicle position (including attitude angles such as a yaw angle) at the current processing time (step S25). Further, the own vehicle position estimator 18 calculates the DAR by counting the measurement point number Nt and the associated measurement point number Nc (step S26). Then, the own vehicle position estimator 18 determines whether or not the variable n representing the number of times to have searched for the estimation parameter P is 1 (step S27).

Then, if the variable n is 1 (step S27; Yes), the own vehicle position estimator 18 sets the search number N in accordance with the DAR calculated at step S26 (step S28). In this case, in some embodiments, the own vehicle position estimator 18 determines the DAR so that the search number N increases with the decrease in the DAR. For example, the own vehicle position estimator 18 sets the search number N as follows.

$$DAR<0.5 \Rightarrow N=40$$

$$0.5 \leq DAR<0.6 \Rightarrow N=30$$

$$0.6 \leq DAR<0.7 \Rightarrow N=20$$

$$0.7 \leq DAR<0.8 \Rightarrow N=10$$

$$0.8 \leq DAR \Rightarrow N=5$$

Thus, since the search number N increases with decreasing DAR due to the deviation between the point cloud data and the voxel data VD, the arrival of the estimation parameter P to the optimal solution becomes stable. On the other hand, if the variable n is not 1 (step S27; No), the own vehicle position estimator 18 does not set the search number N.

If the variable n representing the number of times to have searched for the estimation parameter P is smaller than the search number N (step S29; Yes), the own vehicle position estimator 18 adds the variable n by 1 (step S30) and returns the process to step S23. In this case, the own vehicle position estimator 18 executes the processes at step S23 to step S26 to perform re-search of the estimation parameter P and calculation of the DAR.

On the other hand, if the variable n representing the number of times to have searched for the estimation parameter P is equal to the search number N (Step S29; No), the own vehicle position estimator 18 outputs the latest vehicle position estimation result calculated at step S25 and the latest DAR calculated at step S26 (step S31). In this case, the own vehicle position estimator 18 outputs the vehicle position estimation result and the DAR to a processing block in the control unit 15 or the like configured to perform driving assistance such as autonomous driving.

As described above, the control unit 15 of the in-vehicle device 1 according to the present embodiment is configured to acquire point cloud data outputted by the lidar 2. Then, the control unit 15 is configured to associate, through matching between the acquired point cloud data and voxel data that is position information of an object for each of unit areas (voxels) into which a space is divided, measurement points constituting the point cloud data with voxels, respectively. The control unit 15 performs the position estimation of a moving body equipped with the lidar 2 based on the measurement points associated with any of the voxels which have corresponding voxel data VD and the position information of the object for the associated voxels. The control unit 15 calculates a reliability index of a position acquired by the position estimation based on a DAR that is a ratio of the number of the measurement points associated with any of the voxels to the number of the measurement points constituting the point cloud data. According to this mode, when performing the position estimation through matching between the point cloud data outputted by the lidar 2 and the voxel data VD, the in-vehicle device 1 can suitably acquire an index that accurately represents the reliability of the estimated position.

(6) Modifications

Hereinafter, a description will be given of a preferred modifications to the embodiment described above. The following modifications may be applied to the embodiment in any combination.

(First Modification)

The in-vehicle device 1 may determine the search upper limit number to be referred to at step S18 of the flowchart in FIG. 12 based on the movement speed of the vehicle.

In this case, for example, the in-vehicle device 1 stores in advance an expression or a map indicating the correspondence between the movement speed of the vehicle and the search upper limit number, and sets the search upper limit number by referring to the above-described expression or a map from the movement speed of the vehicle acquired from the vehicle speed sensor 4 or the like. In this case, in some embodiment, the in-vehicle device 1 increases the search upper limit number with the decrease in the movement speed of the vehicle. For example, if the vehicle is stopped or moving at a low speed similar thereto, there will be no or small variation in the vehicle position and it is less necessary to perform the vehicle position estimation every predetermined interval (e.g., 100 ms). Therefore, the in-vehicle device 1 increases the search upper limit number with decreasing movement speed of the vehicle, and when the vehicle is stopped or moving at a low speed corresponding thereto, it prioritizes the calculation of the optimal solution of the estimation parameter P rather than performing the vehicle position estimation at predetermined intervals. Thereby, it is possible to suitably improve the accuracy of the vehicle position estimation in the case where the vehicle is at a stop or moving at low speed.

(Second Modification)

The in-vehicle device 1 may use a value based on the DAR, instead of using the DAR itself, as the reliability index of the position obtained by the in-vehicle position estimation. For example, the in-vehicle device 1 may use, as the reliability index described above, a value obtained by multiplying the DAR by the score value (i.e., evaluation function value E).

Here, the score value is a value indicating the matching degree between the point cloud data and the voxel data VD, and when the optimum value is determined, both the DAR and the score value becomes a large value. Therefore, it is presumed that the larger the result of multiplication of both the DAR and the score value is, the more sufficient the position estimation of the vehicle has been made. Considering the above, in this modification, the in-vehicle device 1 uses the value obtained by multiplying the DAR by the score value as a reliability index, and based thereon determines whether or not the re-search of the estimation parameter P is required. For example, in the example of FIG. 12, at step S17, the in-vehicle device 1 determines whether or not a value obtained by multiplying the DAR calculated at step S16 by the score value corresponding to the estimation parameter P calculated at step S15 is less than a predetermined threshold value. If the above-described value after the multiplication is less than the threshold value (step S17; Yes) and the variable n has not reached the search upper limit number (step S18; Yes), the in-vehicle device 1 executes the processes at step S19 and step S13 to step S16 to perform re-search of the estimation parameter P and calculation of the multiplication value described above. In the same way, in the example of FIG. 13, at step S28, the in-vehicle device 1 sets the search number N based on a value obtained by multiplying the DAR calculated at step S26 by the score value for the estimation parameter P calculated at step S25.

(Third Modification)

The configuration of the driving support system shown in FIG. 1 is an example, and the configuration of the driving support system to which the present invention is applicable is not limited to the configuration shown in FIG. 1. For example, instead of the driving support system having the in-vehicle device 1, the electronic control device of the vehicle may execute the process to be executed by the own vehicle position estimator 18 of the in-vehicle device 1. In this case, for example, the map DB 10 is stored in a storage unit in the vehicle or a server device that performs data communication with the vehicle, and the electronic control device of the vehicle executes the vehicle position estimation based on the NDT scan matching or the like, by referring to the map DB 10.

(Fourth Modification)

The data structure of the voxel data VD is not limited to a data structure that includes a mean vector and a covariance matrix, as shown in FIG. 3. For example, the voxel data VD may include point cloud data, which is measured by a measurement maintenance vehicle and which is used in calculating the mean vector and the covariance matrix, as it is.

(Fifth Modification)

The method of determining the search number N of the estimation parameter P based on the DAR is not limited to the method based on the flowchart shown in FIG. 13. For example, the own vehicle position estimator 18 may hysteresisly determine the search number N based on the DAR.

In this case, if the DAR slightly deteriorates, that is, if the DAR is equal to or larger than the lower threshold value (also referred to as "lower threshold value") for determining the deterioration of the position estimation accuracy, the own vehicle position estimator 18 considers that the deterioration is caused by noise, occlusion, or the like, and is not an essential deterioration. Thus, in this case, the own vehicle position estimator 18 does not change the search number N. On the other hand, the own vehicle position estimator 18 increases the search number N if the DAR is greatly deteriorated, that is, if the DAR is less than the lower threshold value. Then, in this case, the own vehicle position estimator 18 maintains the search number N at the value after the increase until the DAR is sufficiently improved, that is, until the DAR is equal to or larger than an upper threshold value (also referred to as "upper threshold value") for determining stabilization of the position estimation. Thereafter, if the DAR becomes equal to or larger than the upper threshold value, the own vehicle position estimator 18 changes the search number N to the initial value. Thus, while suppressing the search number N from increasing more than necessary, it is possible to stabilize the position estimation at the time of deterioration of the position estimation accuracy.

For example, when the lower threshold value is set to "0.6" and the upper threshold value is set to "0.7", the own vehicle position estimator 18 sets the search number N as follows.

Initial value ⇒N=10

DAR<lower threshold value(0.6)⇒N=20

DAR≥upper threshold value(0.7)⇒N=10

In this case, first, the own vehicle position estimator 18 starts the own vehicle position estimation process with the search number N as "10". Then, once the DAR falls below 0.6 (lower threshold value), the own vehicle position estimator 18 increases the search number N to "20". Thereafter, when the DAR is less than 0.7 (upper threshold value) regardless of the DAR exceeding 0.6, the own vehicle position estimator 18 determines that the position estimation is not yet stably performed, and keeps the search number N at "20". Thereafter, when the DAR becomes 0.7 (upper threshold value) or more, the own vehicle position estimator 18 determines that the position estimation is stable and returns the search number N to "10" that is the initial value. Thereafter, when the DAR becomes 0.6 or more regardless of the DAR being smaller than 0.7, the own vehicle position estimator 18 determines that there is a possibility of an influence due to noise or occlusion and keeps the search number N at "N=10".

Figure 14:
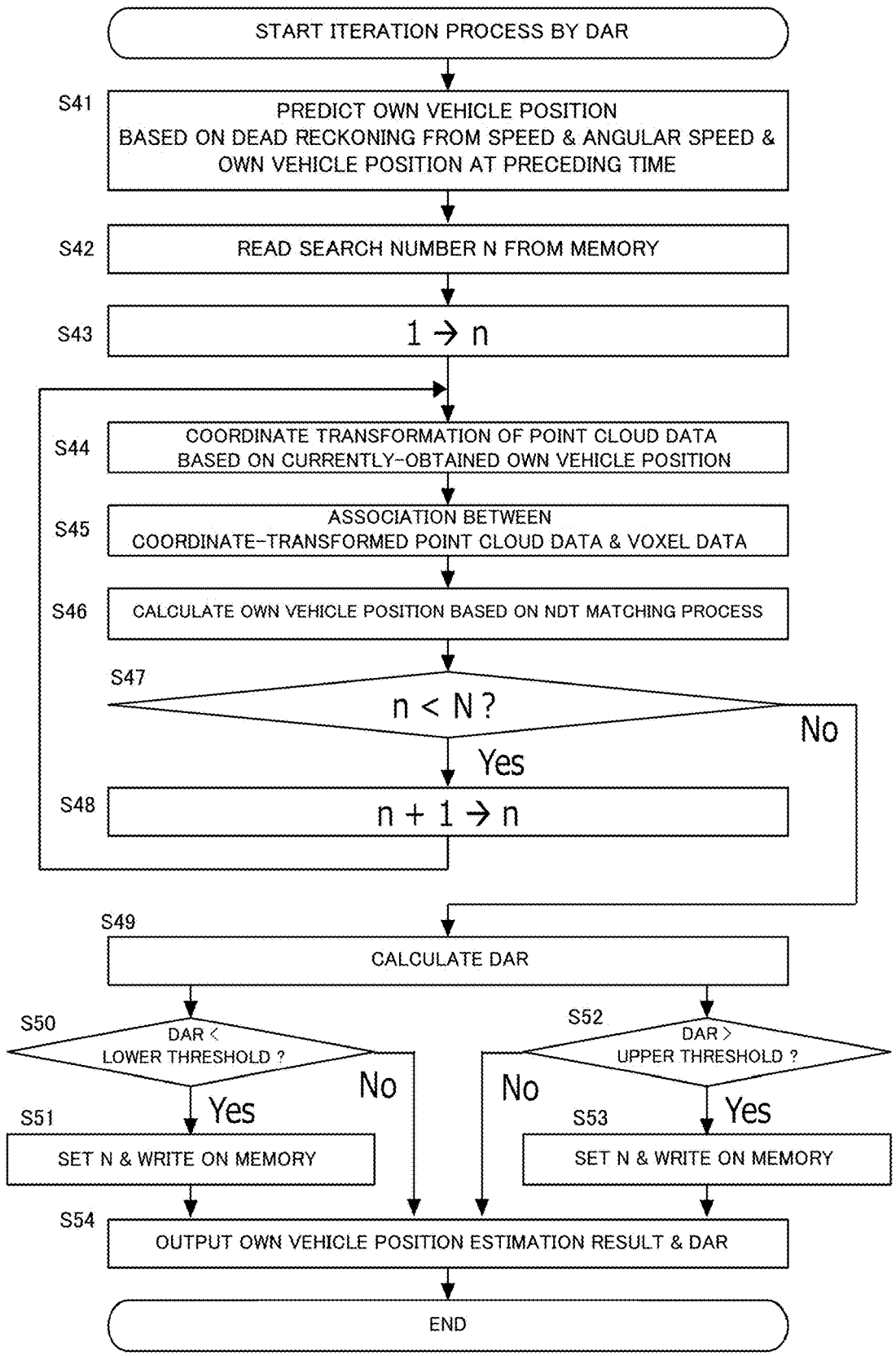
FIG. 14 illustrates an example of a flowchart showing a procedure of the own vehicle position estimation process according to a modification.

FIG. 14 is an example of a flowchart illustrating a procedure of the own vehicle position estimation process according to the fifth modification.

First, the dead reckoning block 21 and the position prediction block 22 of the own vehicle position estimator 18 calculate the predicted vehicle position at the current processing time from the estimated vehicle position obtained at the preceding processing time, in the same way as step S21 in FIG. 13 (step S41). Next, the own vehicle position estimator 18 reads the initial value of the search number N from a memory such as the storage unit 12 (step S42). Then, the own vehicle position estimator 18 sets the variable n representing the number of times to have searched for the estimation parameter P to 1 (step S43). Next, based on the predicted or estimated own vehicle position, the coordinate transformation block 23 of the own vehicle position estimator 18 converts the point cloud data generated in one cycle of scanning by the lidar 2 at the current processing time to data in the world coordinate system, in the same way as step S23 in FIG. 13 (step S44).

Next, the point cloud data association block 24 performs the association between the point cloud data converted into the world coordinate system and voxels which have the corresponding voxel data VD (step S45). Then, the position correction block 25 of the own vehicle position estimator 18 performs NDT matching based on the associated point cloud data and the voxel data VD of the associated voxels, and thereby calculates the estimated vehicle position (including attitude angles such as yaw angle) at the current processing time (step S46).

Next, the own vehicle position estimator 18 determines whether or not the variable n is less than the search number N (step S47). If the variable n is less than the search number N (step S47; Yes), the own vehicle position estimator 18 increases n by 1 (step S48), and returns the process to step S44, and performs the vehicle position estimation by NDT matching until n becomes the search number N. On the other hand, if the variable n is not less than the search number N (step S47; No), that is, if the variable n reaches the search number N, the own vehicle position estimator 18 calculates the DAR (step S49).

Then, the own vehicle position estimator 18 compares the calculated DAR with the lower threshold or the upper threshold. Specifically, in the case where the search number N is the initial value (i.e., when N=10 in the above-described example), the own vehicle position estimator 18 compares the DAR with the lower threshold at step S50, and in the case where the search number N is not the initial value (i.e., when N=20 in the above-described example), it compares the DAR with the upper threshold at step S52.

Then, at step S50, if the own vehicle position estimator 18 determines that the DAR is less than the lower threshold value (step S50; Yes), the own vehicle position estimator 18 sets the search number N and writes it on the memory such as the storage unit 12 (step S51). For example, the own vehicle position estimator 18 writes a value obtained by adding a predetermined value to the initial search number N into the memory as a new search number N. On the other hand, if the DAR is equal to or larger than the lower threshold value (step S50; No), the own vehicle position estimator 18 determines that it is not necessary to change the search number N and advances the process to step S54.

On the other hand, at step S52, if the own vehicle position estimator 18 determines that the DAR is larger than the upper threshold value (step S52; Yes), the own vehicle position estimator 18 sets the search number N and writes it on the memory such as the storage unit 12 (step S53). For example, the own vehicle position estimator 18 sets the search number N to a value (i.e., an initial value) before updating in the previously executed step S51. On the other hand, if the DAR is equal to or smaller than the upper threshold value (step S52; No), the own vehicle position estimator 18 determines that it is not necessary to change the search number N and advances the process to step S54.

Then, the own vehicle position estimator 18 outputs the latest vehicle position estimation result calculated at step S46 and the latest DAR calculated at step S49 (step S54). According to this flowchart, while avoiding increasing the search number N more than necessary, it is possible to stabilize the position estimation at the time of deterioration of the position estimation accuracy.

While the present invention has been described with reference to the embodiments, the present invention is not limited to the above embodiments. Various changes that can be understood by those skilled in the art within the scope of the present invention can be made in the configuration and details of the present invention. In other words, it is needless to say that the present invention includes various modifications that could be made by a person skilled in the art according to the entire disclosure including the scope of the claims, and the technical philosophy. In addition, all patent and non-patent literatures mentioned in this specification are incorporated by reference in its entirety.

DESCRIPTION OF REFERENCE NUMERALS

1 In-vehicle equipment
2 Lidar
3 Gyroscope sensor
4 Vehicle speed sensor
5 GPS receiver
10 Map DB

What is claimed is:

1. An information processing device comprising:
  a processor coupled to a memory storing instructions to permit the processor to function as:
  an acquisition unit configured to acquire point cloud data outputted by a measurement device;
  an association unit configured to associate, through matching between the point cloud data and position information of an object for each of voxels into which a space is divided, measurement points constituting the point cloud data with the voxels;
  a position estimation unit configured to perform a position estimation of a moving body equipped with the measurement device, based on the measurement points associated with any of the voxels and the position information for the associated voxels; and
  a calculation unit configured to calculate a reliability index of a position acquired by the position estimation based on a ratio of a number of the measurement points associated with any of the voxels to a number of the measurement points constituting the point cloud data,
  wherein, based on a result of the calculated reliability index, autonomous driving assistance of the moving body is controlled,
  wherein the position estimation unit determines whether or not to re-perform the position estimation based on the reliability index,
  wherein the position estimation unit repeatedly performs the position estimation until at least one condition is satisfied among:
   a condition that the reliability index is equal to or larger than a predetermined threshold value;
   a condition that there is no variation in the reliability index; and
   a condition that a number of times to have performed the position estimation reaches a predetermined upper limit number, and
  wherein the position estimation unit determines the upper limit number based on a movement speed of the moving body.

2. The information processing device according to claim 1, wherein the position estimation unit performs the position estimation by searching for an estimation parameter relating to the position of the moving body within a predetermined search range, and
  wherein the position estimation unit determines the search range to be used when re-performing the position estimation, based on a value of the estimation parameter acquired by immediately preceding position estimation.

3. The information processing device according to claim 1,
  wherein the position estimation unit performs the position estimation by searching for an estimation parameter relating to the position of the moving body within a predetermined search range, and
  wherein the position estimation unit performs the position estimation, by a number of times determined based on the reliability index, using the search range determined based on a value of the estimation parameter acquired by immediately preceding position estimation.

4. The information processing device according to claim 1,
  wherein the position estimation unit calculates the reliability index based on:
  a degree of the matching between the measurement points associated with any of the voxels and the position information for the associated voxels; and
  the ratio.

5. A control method executed by an information processing device, the control method comprising:
  acquiring point cloud data outputted by a measurement device;
  associating, through matching between the point cloud data and position information of an object for each of voxels into which a space is divided, measurement points constituting the point cloud data with the voxels;

performing a position estimation of a moving body equipped with the measurement device, based on the measurement points associated with any of the voxels and the position information for the associated voxels;

calculating a reliability index of a position acquired by the position estimation based on a ratio of a number of the measurement points associated with any of the voxels to a number of the measurement points constituting the point cloud data; and controlling autonomous driving assistance of the moving body based on a result of the calculated reliability index, wherein the performing of the position estimation determines whether or not to re-perform the position estimation based on the reliability index, wherein the performing of the position estimation repeatedly performs the position estimation until at least one condition is satisfied among:
- a condition that the reliability index is equal to or larger than a predetermined threshold value;
- a condition that there is no variation in the reliability index; and
- a condition that a number of times to have performed the position estimation reaches a predetermined upper limit number, and wherein the performing of the position estimation determines the upper limit number based on a movement speed of the moving body.

6. A non-transitory computer readable medium including instructions executed by a computer, the instructions comprising:

acquiring point cloud data outputted by a measurement device;

associating, through matching between the point cloud data and position information of an object for each of voxels into which a space is divided, measurement points constituting the point cloud data with the voxels;

performing a position estimation of a moving body equipped with the measurement device, based on the measurement points associated with any of the voxels and the position information for the associated voxels;

calculating a reliability index of a position acquired by the position estimation based on a ratio of a number of the measurement points associated with any of the voxels to a number of the measurement points constituting the point cloud data; and controlling autonomous driving assistance of the moving body based on a result of the calculated reliability index, wherein the performing of the position estimation determines whether or not to re-perform the position estimation based on the reliability index, wherein the performing of the position estimation repeatedly performs the position estimation until at least one condition is satisfied among:
- a condition that the reliability index is equal to or larger than a predetermined threshold value;
- a condition that there is no variation in the reliability index; and
- a condition that a number of times to have performed the position estimation reaches a predetermined upper limit number, and wherein the performing of the position estimation determines the upper limit number based on a movement speed of the moving body.

* * * * *